US007012863B2

(12) United States Patent
Hayashi

(10) Patent No.: US 7,012,863 B2
(45) Date of Patent: Mar. 14, 2006

(54) ROTATION CONTROL CIRCUIT, SEMICONDUCTOR INTEGRATED CIRCUIT, OPTICAL DISK DRIVE AND METHOD FOR CONTROLLING THE SAME

(75) Inventor: Yasuhiro Hayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 348 days.

(21) Appl. No.: 10/383,061

(22) Filed: Mar. 7, 2003

(65) Prior Publication Data

US 2003/0210621 A1 Nov. 13, 2003

(30) Foreign Application Priority Data

Mar. 8, 2002 (JP) ............................ P2002-064437

(51) Int. Cl.
*G11B 20/10* (2006.01)
*G11B 7/00* (2006.01)

(52) U.S. Cl. ................ 369/47.1; 369/47.41; 369/53.14
(58) Field of Classification Search ............... 369/47.1, 369/44.29, 44.13, 44.26, 44.34, 44.32, 44.35, 369/53.14, 53.19, 53.37, 53.28, 47.41, 53.12; 360/75; 388/815

See application file for complete search history.

(56) References Cited

U.S. PATENT DOCUMENTS

| | | | | |
|---|---|---|---|---|
| 5,363,358 A | * | 11/1994 | Yanagawa | 369/44.29 |
| 5,623,138 A | * | 4/1997 | Lee | 369/44.34 |
| 5,684,763 A | * | 11/1997 | Kurita et al. | 369/13.02 |
| 5,867,337 A | * | 2/1999 | Shimomura | 360/75 |
| 5,905,703 A | * | 5/1999 | Osada | 369/44.41 |
| 6,011,902 A | * | 1/2000 | Yamamoto | 388/815 |
| 6,041,030 A | * | 3/2000 | Ohmi | 369/53.19 |
| 6,137,757 A | * | 10/2000 | Kinoshita | 369/47.41 |
| 6,226,245 B1 | * | 5/2001 | Fueki | 369/53.3 |
| 6,483,787 B1 | * | 11/2002 | Sugasawa et al. | 369/44.13 |
| 6,498,772 B1 | * | 12/2002 | Fujiune et al. | 369/44.29 |
| 2002/0141303 A1 | * | 10/2002 | Kim | 369/44.32 |

FOREIGN PATENT DOCUMENTS

| | | |
|---|---|---|
| JP | 58-9226 | 1/1983 |
| JP | 3-194736 | 8/1991 |
| JP | 10-21571 | 1/1998 |
| JP | 2000-20989 | 1/2000 |
| JP | 2000-339712 | 12/2000 |
| JP | 2000-357336 | 12/2000 |
| JP | 2001-118271 | 4/2001 |
| JP | 2001-222325 | 8/2001 |
| KR | 2000-0061055 | 10/2000 |
| WO | WO 01/80234 A1 | 10/2001 |

* cited by examiner

*Primary Examiner*—William Korzuch
*Assistant Examiner*—Kim-Kwok Chu
(74) *Attorney, Agent, or Firm*—Oblon, Spivak, McClelland, Maier & Neustadt, P.C.

(57) ABSTRACT

A rotation control circuit comprising, a pickup controller configured to amplify an error signal detected by a pickup from an optical disk, and to generate both a low-frequency component in the error signal and a pickup control signal so as to control the pickup, a memory controller configured to generate a memory address control signal in synchronization with a frequency generator signal provided by a disk motor, a memory circuit configured to store the low-frequency component by using the memory address control signal at a specified timing, a compensation signal adder configured to add the low-frequency component to the pickup control signal at another specified timing, and a system controller configured to control operational timing of the memory controller and the compensation signal adder.

21 Claims, 32 Drawing Sheets

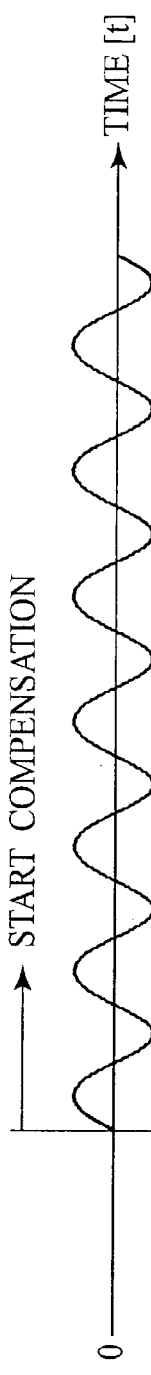
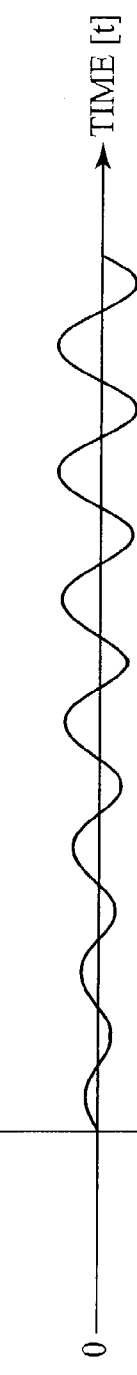
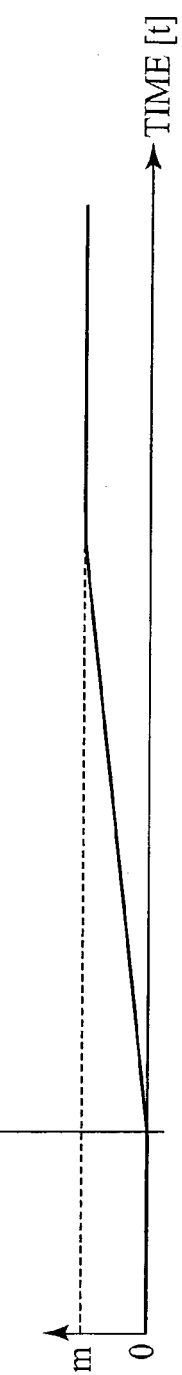
FIG. 11A
MEMORY OUTPUT
FIG. 11B
COMPENSATION SIGNAL
FIG. 11C
AMPLIFICATION FACTOR

FREQUENCY CHARACTERISTIC

FREQUENCY CHARACTERISTIC

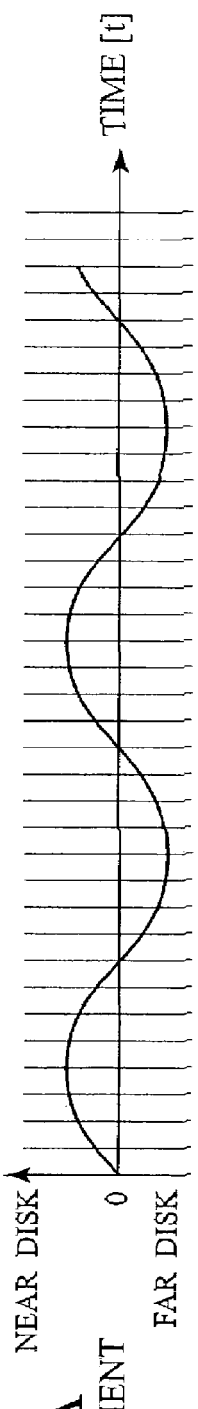
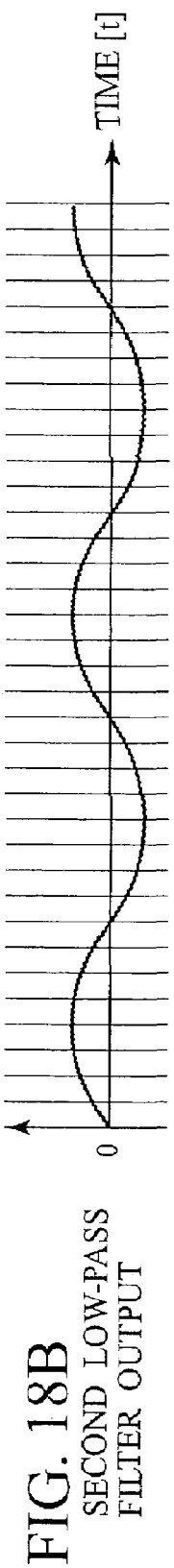
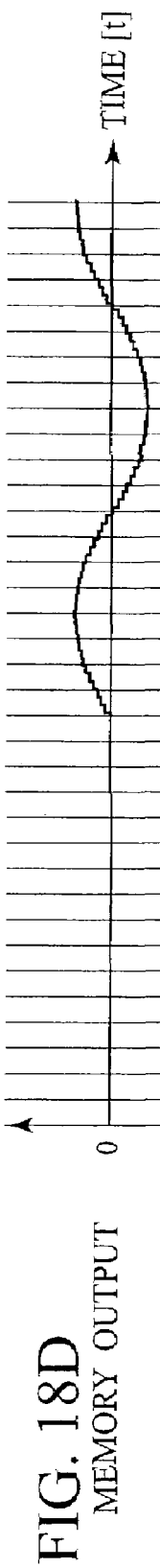
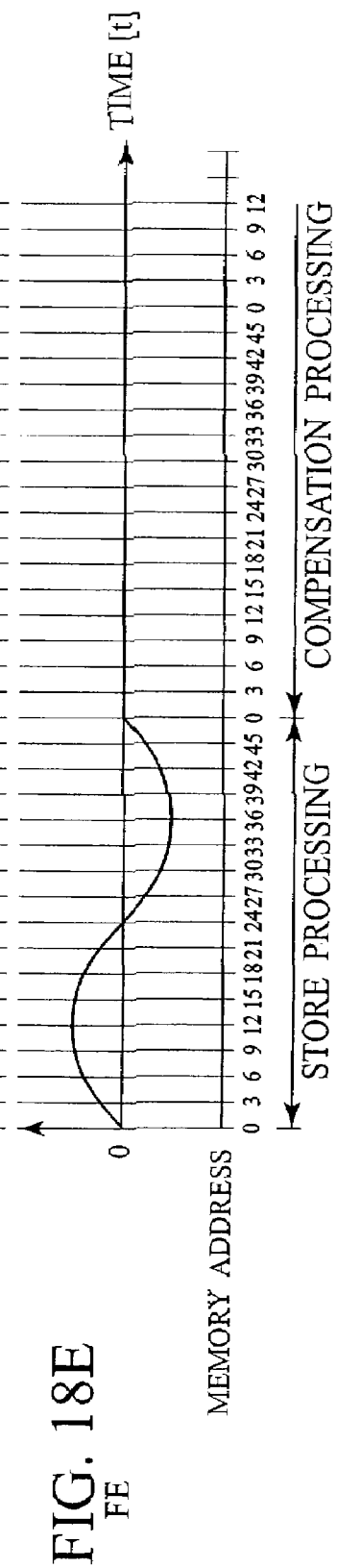
FIG. 18A DISPLACEMENT
FIG. 18B SECOND LOW-PASS FILTER OUTPUT
FIG. 18C AD CONVERTER OUTPUT
FIG. 18D MEMORY OUTPUT
FIG. 18E FE

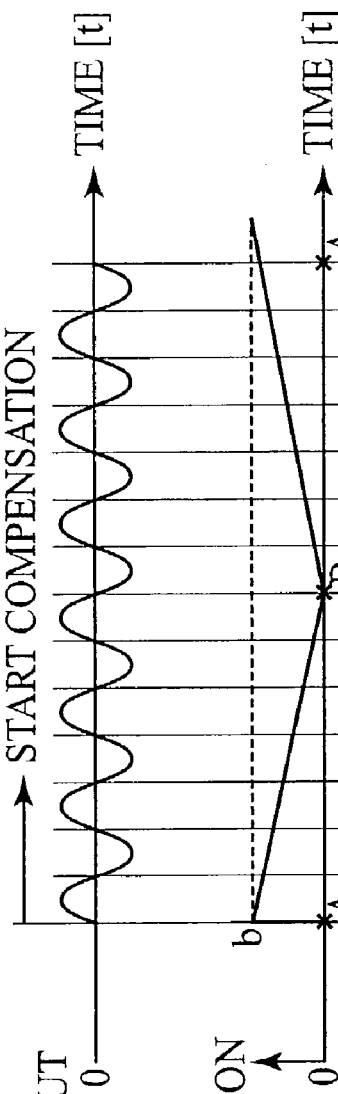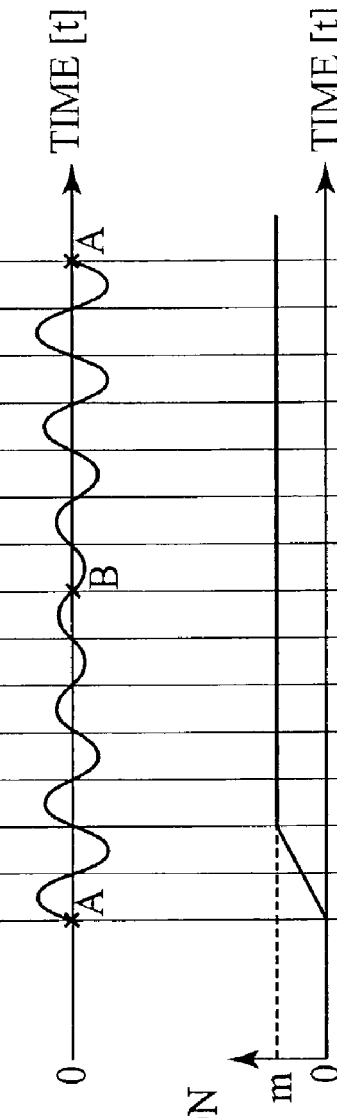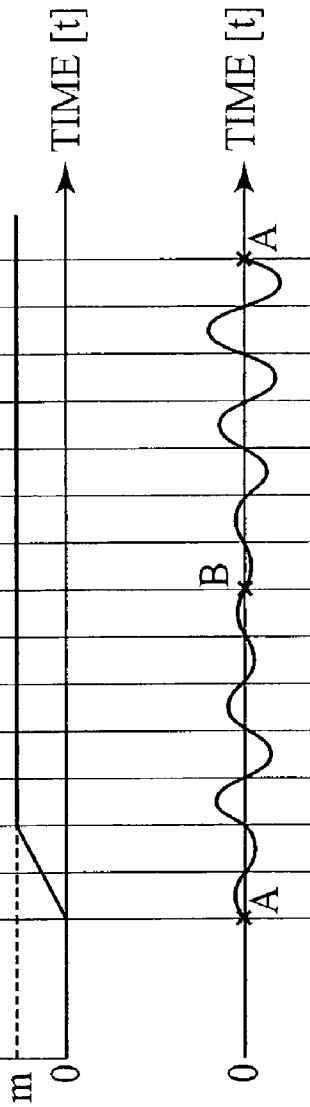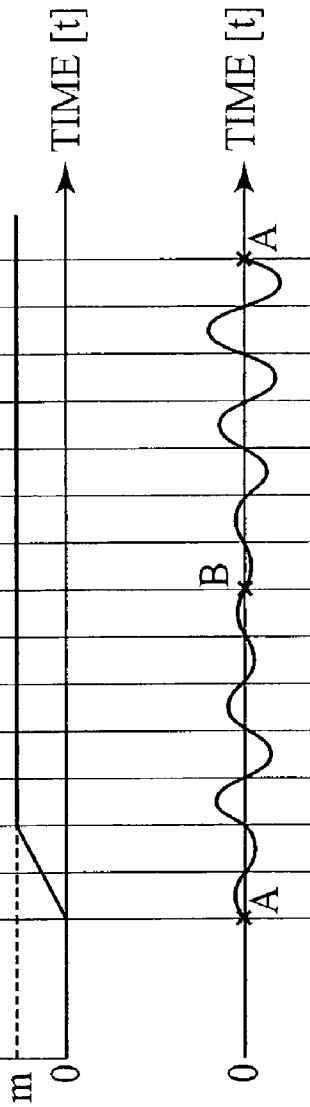
FIG. 24A MEMORY OUTPUT
FIG. 24B DISK DEFLECTION COEFFICIENT
FIG. 24C MULTIPLIED MEMORY OUTPUT
FIG. 24D AMPLIFICATION FACTOR
FIG. 24E AMPLIFIED MEMORY OUTPUT

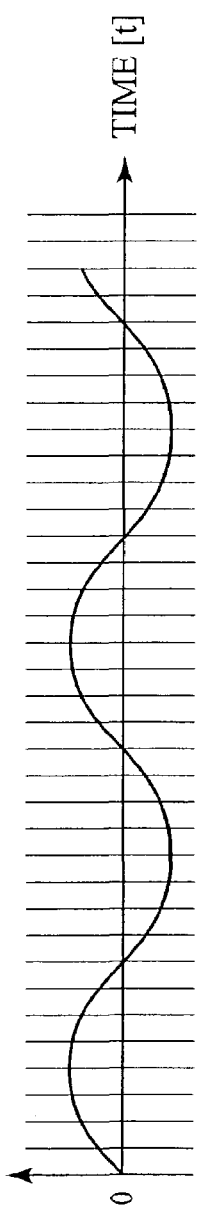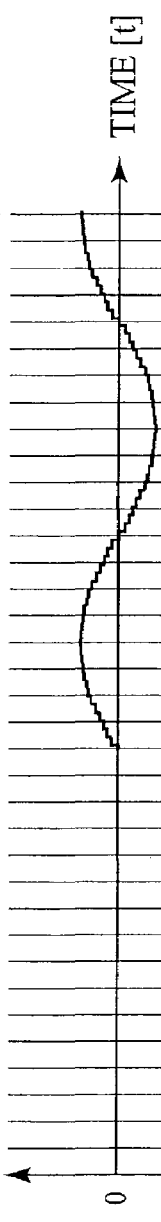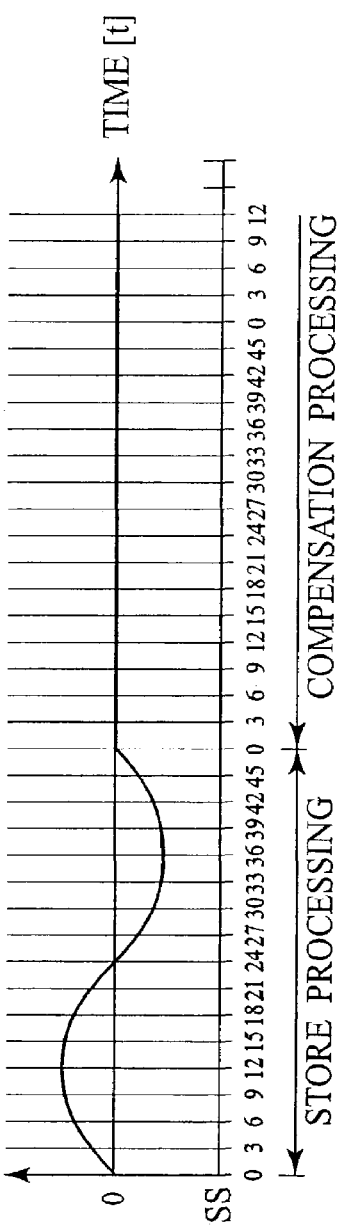
FIG. 30A DISPLACEMENT
FIG. 30B FIRST LOW-PASS FILTER OUTPUT
FIG. 30C MEMORY OUTPUT
FIG. 30D TE

ROTATION CONTROL CIRCUIT, SEMICONDUCTOR INTEGRATED CIRCUIT, OPTICAL DISK DRIVE AND METHOD FOR CONTROLLING THE SAME

CROSS REFERENCE TO RELATED APPLICATIONS

This application is based upon and claims the benefit of priority from prior Japanese Patent Application No. P2002-064437, filed on Mar. 8, 2002; the entire contents of which are incorporated by reference herein.

BACKGROUND OF THE INVENTION

1. Field of the Invention

The present invention relates to an optical disk drive, and more particularly, relates to a rotation control circuit, a semiconductor integrated circuit, and a method for controlling the same.

2. Description of the Related Art

Recently, with acceleration of optical disk drive speeds, the technology of rotating an optical disk at high-speed close to the limit of a disk motor and a pickup has become widely developed. An optical disk drive for a disk such as digital versatile disk (DVD) having two layers requires a number of precise high-speed servo controls of the optical disk such as a focus servo and a tracking servo, in addition to controlling the rotation. For example, a focus servo moves the lens in a pickup in the focus direction (direction of optical axis of the lens) based on a focus error signal. By the tracking servo control, track-jump from one particular track to other tracks can be achieved. By the focus servo control, focus-jump from one layer to another layer can be achieved.

An optical disk is fixed to a disk motor by equipment called a clamper. However, the damper cannot fix the optical disk in an ideal condition, because the optical disk has physical dimensional errors. Therefore, an eccentricity may result that means a horizontal shift occurs when the optical disk rotates, and a disk deflection may result that means related error in a shift from perpendicular plane of rotating shaft occurs. That is to say, a relative speed condition between the pickup and the optical disk changes.

Constant linear velocity (CLV) and constant angular velocity (CAV) control are known as main rotational speed control systems. In the case of CAV control, a rotational speed of a CD-ROM at 48× speed drive will reach 8640 rpm at 3 (Hz/speed)×48×speed=144 Hz at the circumference of the disk. In the case of a DVD at 16× speed drive, the rotational speed reaches 9600 rpm at 10 (Hz/speed)×16×speed=160 Hz at the circumference of the disk. During the high-speed rotation, speed of a beam spot on the optical disk also becomes very high. The beam spot shifts over the 68 tracks, when the DVD rotates at 16× speed with a track pitch is 0.74 $\mu$m and eccentricity quantity of 50 $\mu$m. Therefore, maximum relative speed between the lens and the track reaches 40 KHz, converted into a tracking error signal frequency. The control frequency band of a tracking servo generally reaches 5–7 KHz. Therefore, it is not possible to return to a normal operation when the tracking servo deviates at the maximum speed. A vibration of a pickup mechanism created by the eccentricity of the optical disk also considerably increases.

The relative speed between the optical disk and the pickup lens becomes high when rotational speed of the optical disk becomes very high. The servo system loses the controllable frequency band when seek speed between the optical disk and the pickup lens becomes high. As a result, an open loop gain of the servo system decreases in proportion to an increase in the rotational frequency of the optical disk. As a result, residual error showing the servo performance increases. When the residual error increases, a tracking characteristic of the pickup for the eccentricity and the disk deflection deteriorate. Therefore, a radio frequency (RF) signal that is the information signal deteriorates, and the pickup cannot read the data. As a result, it is difficult for the pickup to accurately executes a jump operation of track jump and layer jump. Seek performance of the optical disk drive also remarkably decreases, when the success probability of the track jump and the layer jump decreases. The seek performance decides the performance for reading the data from the optical disk. In addition, jump failure during high-speed rotation of the disk causes a time loss. Since DVD has only two layers, when the pickup fails to layer jump in one layer of the DVD, the pickup cannot settle in another layer. The control must be designed so that the success probability of track jump and layer jump may be improved by the tracking servo and focus servo, since the servo gain can not be sufficiently ensured and such design is very difficult.

SUMMARY OF THE INVENTION

A first aspect of the present invention inheres in a rotation control circuit encompassing, a pickup controller configured to amplify an error signal detected by a pickup from an optical disk, and to generate both a low-frequency component in the error signal and a pickup control signal so as to control the pickup, a memory controller configured to generate a memory address control signal in synchronization with a frequency generator signal provided by a disk motor, a memory circuit configured to store the low-frequency component by using the memory address control signal at a specified timing, a compensation signal adder configured to add the low-frequency component to the pickup control signal at another specified timing, and a system controller configured to control operational timing of the memory controller and the compensation signal adder.

A second aspect of the present invention inheres in an optical disk drive encompassing, an optical disk, a disk motor configured to drive the optical disk, a pickup configured to emit a light to the optical disk, and to read a reflected light from the optical disk, a rotation control circuit configured to generate both a low-frequency component in an error signal detected by the pickup and a pickup control signal for control of the pickup, and to store the low-frequency component in synchronization with a rotation of the optical disk, and to add the low-frequency component to the pickup control signal, a signal processor configured to provide a reproducing signal and a recording signal to the pickup, a record controller configured to record the recording signal in the optical disk, and a disk motor controller configured to control the rotation of the disk motor.

A third aspect of the present invention inheres in a semiconductor integrated circuit encompassing, a semiconductor chip, a tracking servo controller integrated on the semiconductor chip and configured to receive a tracking error signal, a focus servo controller integrated on the semiconductor chip and configured to receive a focus error signal, a memory controller integrated on the semiconductor chip and configured to generate a memory address control signal in synchronization with a frequency generator signal provided by a disk motor, a memory circuit integrated on the semiconductor chip and configured to store a low-frequency component in the tracking error signal and the focus error signal by using the memory address control signal at a specified timing, and a compensation signal adder integrated on the semiconductor chip and configured to add the low-frequency component to output signals of the tracking servo controller and the focus servo controller at another specified timing.

A fourth aspect of the present invention inheres in a method for controlling rotation encompassing, amplifying an error signal detected by a pickup from an optical disk, and generating both a low-frequency component in the error signal and a pickup control signal so as to control the pickup, judging whether a rotational frequency of a disk motor is steady state, storing the low-frequency component in synchronization with a frequency generator signal generated by the disk motor, judging whether the storing is ended, and adding the low-frequency component to the pickup control signal.

BRIEF DESCRIPTION OF THE DRAWINGS

FIGS. 11A–11C are time charts showing the operation of a rotation control circuit according to a modification of the first embodiment of the present invention;

FIGS. 18A–18E are time charts showing the operation of the rotation control circuit according to the second embodiment of the present invention;

FIGS. 24A–24E are time charts showing the operation of the rotation control circuit according to the third embodiment of the present invention;

FIGS. 30A–30D are time charts showing the operation of the rotation control circuit according to the fourth embodiment of the present invention;

DETAILED DESCRIPTION OF EMBODIMENTS

Figure 1:
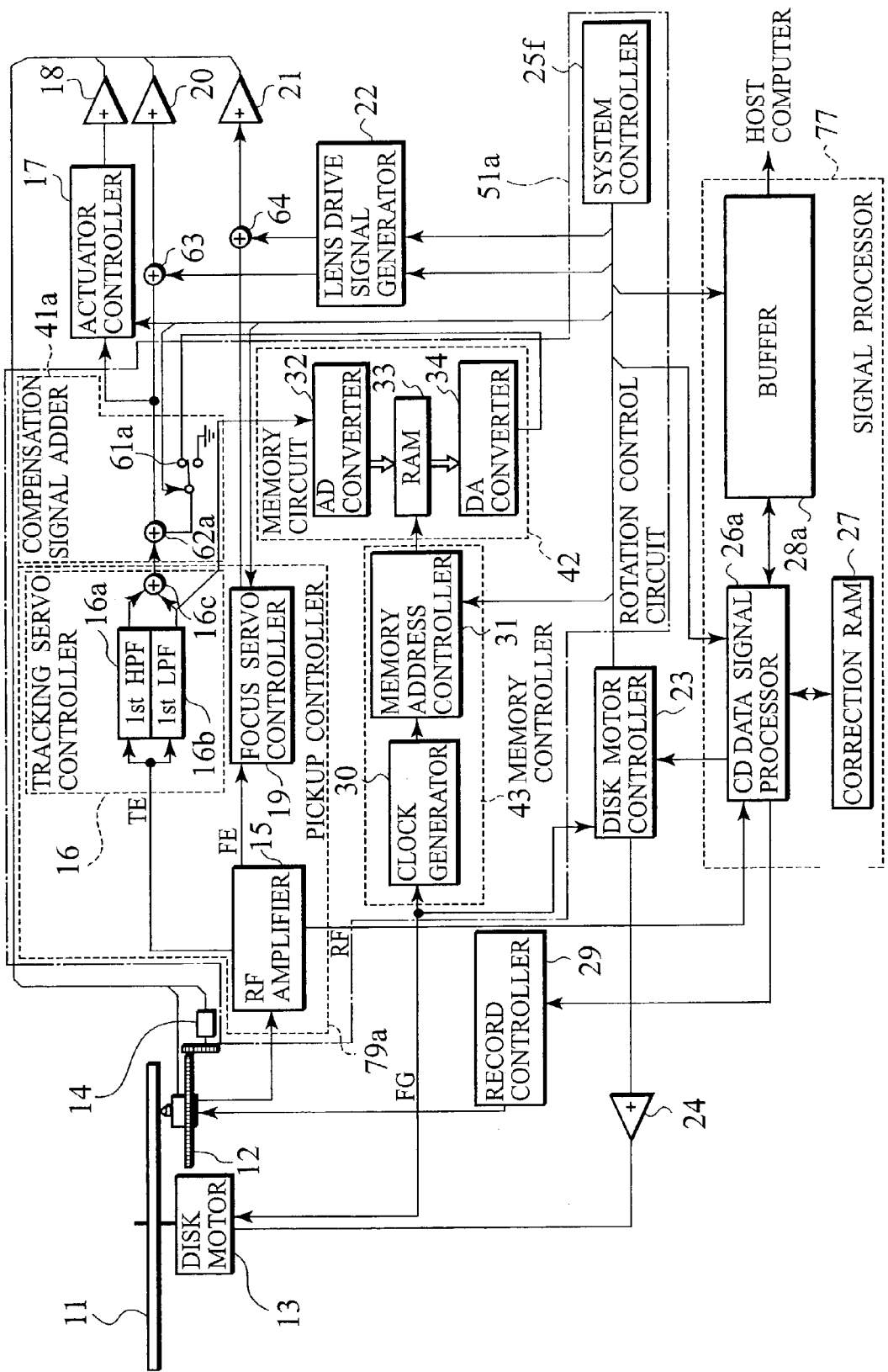
FIG. 1 is a block diagram of an optical disk drive according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, a word "connect"

defines a state in which first and second elements are electrically connected to each other without regard to whether or not there is a physical connection between the elements.

In a first practical embodiment of the present invention, a compact disk-recordable/rewritable (CD-R/RW) drive is explained as an optical disk drive. However, the data recorded in the optical disk are digital data signals of a video, except for audio signals. It is possible to also realize the DVD drive in the similar configuration. In second through fourth embodiments of the present invention, a DVD player/recorder is explained as an optical disk drive. However, the data recorded in the optical disk are video, audio signal encoded based on the moving picture experts group 2 (MPEG2) standard.

(First Embodiment)

As shown in FIG. 1, a optical disk drive according to a first embodiment of the present invention includes an optical disk 11, a pickup 12, a rotation control circuit 51a connected to the pickup 12, a signal processor 77 connected to the rotation control circuit 51a, a record controller 29 connected to the signal processor 77, a disk motor controller 23 connected to the rotation control circuit 51a, a disk motor 13 connected to the disk motor controller 23. The disk motor 13 drives the optical disk 11. The pickup 12 emits a light to optical disk 11, and the pickup 12 reads the reflected light from the optical disk 11. The signal processor 77 processes the signal necessary for reproducing and recording to the pickup 12. The record controller 29 controls the recording based on a record signal generated by signal processor 77 in the optical disk 11. The disk motor controller 23 controls the rotation of the disk motor 13. Rotation control circuit 51a is connected to an actuator controller 17, an adder 63, and an adder 64. The adder 63 and the adder 64 are connected to the lens drive signal generator 22.

As shown in FIG. 1, the rotation control circuit 51a includes a pickup controller 79a connected to the pickup 12, a memory controller 43 connected to the disk motor 13, a memory circuit 42 connected to the pickup controller 79a and the memory circuit 42, a compensation signal adder 41a connected to the memory circuit 42 and the pickup controller 79a, and a system controller 25f connected to the memory controller 43 and the compensation signal adder 41a. The pickup controller 79a generates both a low-frequency component in the error signal and a pickup control signal necessary for the control of the pickup 12. The memory controller 43 generates a memory address control signal in synchronization with a frequency generator (FG) signal provided by the disk motor 13. The FG signal is angular velocity information provided by the disk motor 13. Using the memory address control signal, the memory circuit 42, in specific timing, stores the low-frequency component in the error signal. The compensation signal adder 41a, in another timing, adds the low-frequency component in the error signal stored in the memory circuit 42 to the pickup control signal. A system controller 25f controls operational timing of memory controller 43 and the compensation signal adder 41a.

As shown in FIG. 1, the pickup controller 79a includes a radio frequency (RF) amplifier 15 connected to the pickup 12, a tracking servo controller 16 and a focus servo controller 19 connected to the amplifier 15. The RF amplifier 15 amplifies a tracking error signal TE provided by the pickup 12. In addition, the RF amplifier 15 generates a focus error signal FE and a RF signal that is informational signal.

Figure 2:
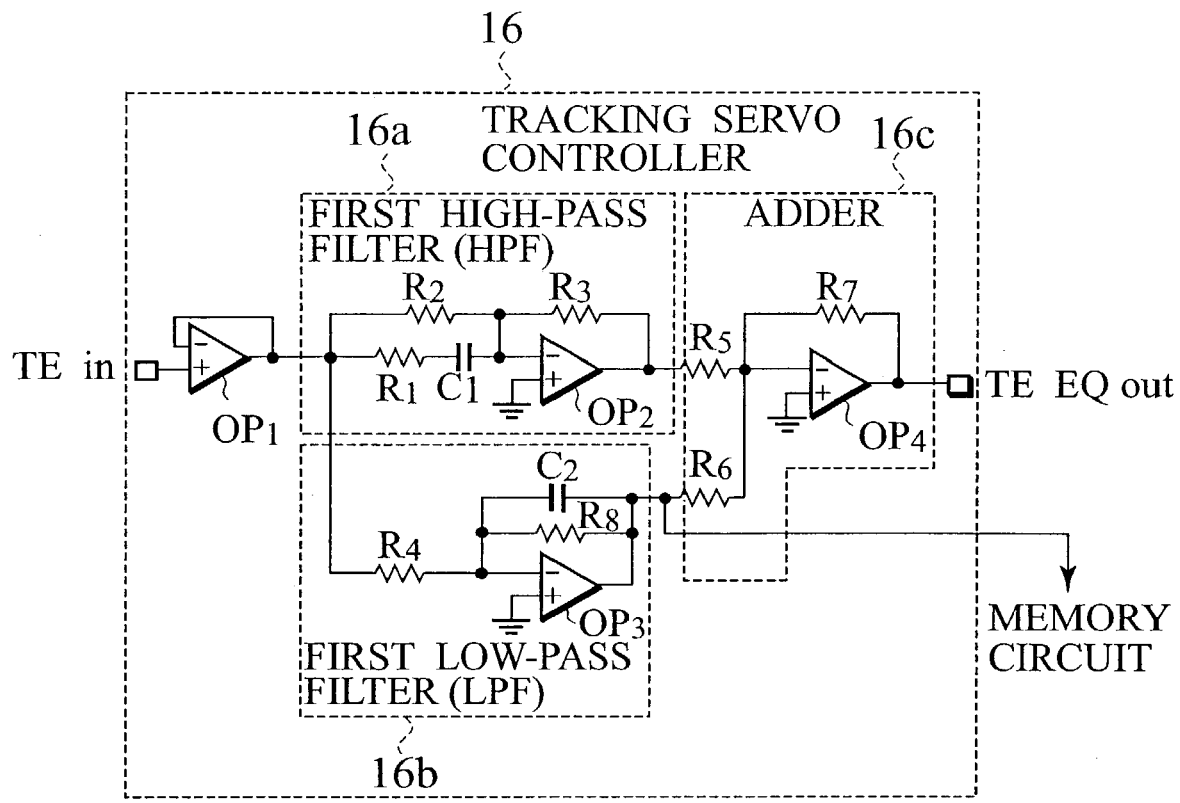
FIG. 2 is a circuit diagram of a tracking servo controller according to the first embodiment of the present invention.

As shown in FIG. 2, the tracking servo controller 16 includes first high-pass filter 16a and a first low-pass filter 16b connected to the RF amplifier 15, and an adder 16c having an input terminal connected to the first high-pass filter 16a, and another input terminal connected to the first low-pass filter 16b. A second operational amplifier OP2 functions as an input buffer. The first high-pass filter 16a includes a first resistor $R_1$, a second resistor $R_2$ connected in parallel with the first resistor $R_1$, a second operational amplifier $OP_2$ having a positive input terminal connected to a ground, a first capacitor $C_1$ connected between the first resistor $R_1$ and a negative input terminal of the second operational amplifier $OP_2$, a third resistor $R_3$ connected between an output terminal of the second operational amplifier $OP_2$ and a connection point of the second resistor $R_2$ and the first capacitor $C_1$. The first low-pass filter 16b includes a third operational amplifier $OP_3$ having a positive input terminal connected to the ground, a fourth resistor $R_4$ connected to a negative input terminal of the third operational amplifier $OP_3$, a second capacitor $C_2$ connected between a output terminal of the third operational amplifier $OP_3$ and a connection point of the negative input terminal of the third operational amplifier $OP_3$ and a output terminal of the third operational amplifier $OP_3$, and an eighth resistor $R_8$ connected in parallel with the second capacitor $C_2$. The adder 16c includes a fifth resistor $R_5$ connected to output side of the first high-pass filter 16a, a sixth resistor $R_6$ connected to an output side of the first low-pass filter 16b, a fourth operational amplifier $OP_4$ having a negative input terminal connected to the fifth resistor $R_5$ and the sixth resistor $R_6$, and a positive input terminal connected to the ground, and a seventh resistor $R_7$ connected between a output terminal of the fourth operational amplifier $OP_4$ and the negative input terminal of the operational amplifier $OP_4$.

Figure 3:
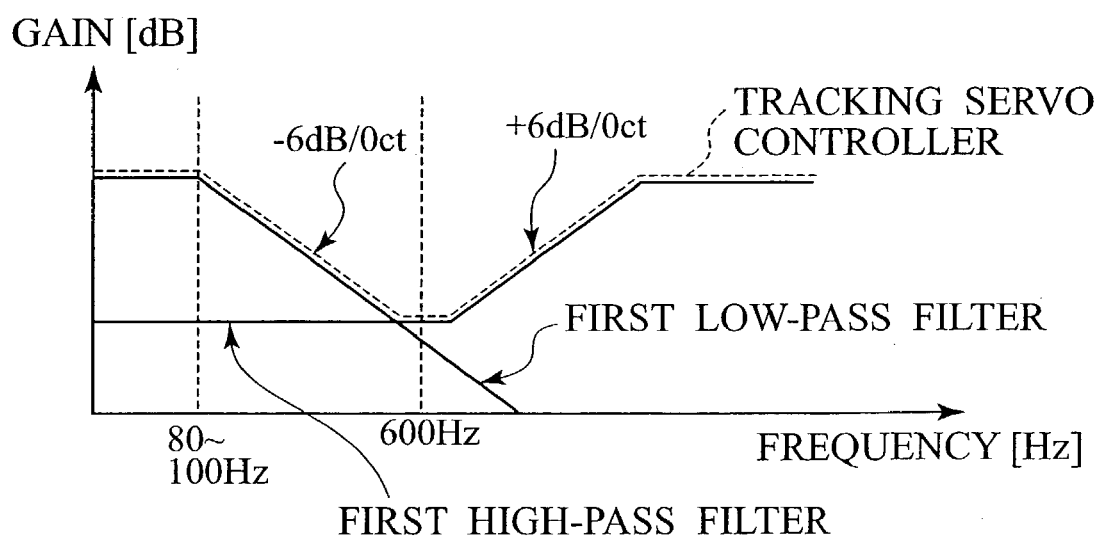
FIG. 3 shows a frequency characteristic of a tracking servo controller according to the first embodiment of the present invention.

As shown in FIG. 3, the first high-pass filter 16a and the first low-pass filter 16b have different frequency characteristics respectively. A broken line shown in FIG. 3 is a frequency characteristics of the whole tracking servo controller 16. An output signal of the first low-pass filter 16b is used to used to compensate the gain. An output signal of the first high-pass filter 16a is used to push phase of the tracking error signal TE so as to control the phase. As a result, the output signal of the first low-pass filter 16b is used as a low frequency component of the error signal generated by the pickup control circuit 79a. In the case of the CAV control, the low frequency component in the error signal corresponds to a rotational frequency of the optical disk 11. Therefore, in the case of the CD circumference speed of 48× for CAV control, a frequency band of the low frequency component of the error signal is a frequency band of about 160 Hz or less. Whereas, in the case of the DVD with a circumference speed of 16× for a CAV control, a frequency band of a low frequency component of the error signal is in the frequency band of about 144 Hz or less.

The focus error signal FE is transmitted to the focus servo controller 19 shown in FIG. 1. A focus servo equalizer is contained in focus servo controller 19. For example, the focus servo equalizer includes an anti-alias filter supplied with the focus error signal FE, an AD converter supplied with an output signal of the anti-alias filter, a finite impulse response (FIR) filter supplied with an output signal of the AD converter, and a DA converter supplied with an output signal of the FIR filter.

An output side of the first low-pass filter 16b is also connected to the memory circuit 42. As shown in FIG. 1, the memory circuit 42 includes a RAM 33, an AD converter 32 connected to an input side of the RAM 33, and a DA converter 34 connected to an output side of the RAM 33. As the RAM 33, various memories such as a dynamic random access memory (DRAM), static random access memory (SRAM) etc. are available. Storage capacity of the RAM 33 is of a capacity that can store the output signal of the low-pass filter 16b corresponding to the optical disk 11 of one turn. Concretely, RAM 33 has a bit length of about 16 bits.

The compensation signal adder 41a includes a first adder 62a connected to the tracking servo controller 16, and a first switch circuit 61a connected between the first adder 62a and the memory circuit 42. As the first switch circuit 61a, a transistor such as a bipolar junction transistor (BJT), field effect transistor (FET) etc. is available. An output signal of the memory circuit 42 is transmitted to the first switch circuit 61a. The first switch circuit 61a switches the connection between the memory circuit 42 and the first adder 62a.

In addition, the memory controller 43 includes a clock generator 30 connected to the disk motor 13, and a memory address controller 31 having the input side connected to the clock generator 31 and output side connected to the RAM 33. The clock generator 31 multiplies the FG signal provided by the disk motor 13, and generates a clock of frequency higher than the FG signal. Memory address controller 31 is synchronized with the clock and the memory address controller 31 controls the writing and readout address of RAM 33. For example, the clock generator 30 includes a phase comparator connected to the disk motor 13, a low-pass filter connected to the phase comparator, and a voltage controlled oscillator having an input side connected to the low-pass filter and an output side connected to the phase comparator.

Figure 4:
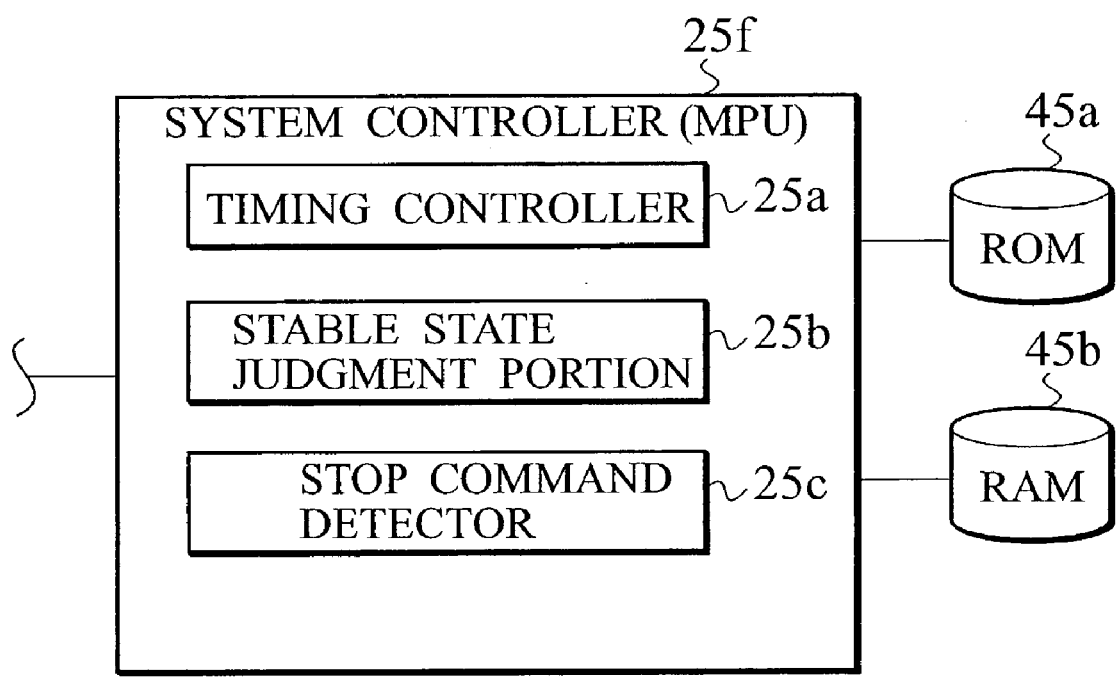
FIG. 4 is a functional block diagram of a system controller according to the first embodiment of the present invention.

As shown in FIG. 4, the system controller 25f includes a timing controller 25a configured to control operation timing of the system of the optical disk drive shown in FIG. 1. In addition, the system controller 25f includes a stable state judgment portion 25b configured to judge whether rotation of the disk motor 13 is steady state or not, and a stop command detector 25c configured to detect the stop command of the rotation compensation. A read only memory (ROM) 45a and a random access memory (RAM) 45b are connected to the system controller 25f. The ROM 45a functions as a program memory executed at systems controller 25f. The RAM 45b functions as a data memory utilized as a work area or stores data utilized under program execution processing at the system controller 25f.

An output side of the first adder 61a shown in FIG. 1 is connected to the actuator controller 17. The actuator controller 17 drives an actuator 14 through a motor driver 18. The actuator 14 and motor driver 18 constitute a pickup drive mechanism. An output side of the focus servo controller 19 is connected to the adder 64. In the adder 64, the output signal of the lens drive signal generator 22 driving the lens in the focus search is added. The adder 64 drives the focus actuator in the pickup 12 through actuator driver 21. The RF signal generated by the RF amplifier 15 is transmitted to the signal processor 77. In reading out, the RF signal is first transmitted to the CD data signal processor 26a. The CD data signal processor 26a pulls out a data signal, and converts the data signal into a binary value, and a bit clock and synchronizing signal are extracted. Simultaneously, demodulation and error correction using correction RAM 27 are carried out. Next, buffer 28a buffers the data, and the data is sent to the host computer.

In recording, the record data supplied by the host computer is buffered by the buffer 28a. The CD data signal processor 26a adds ID data and parity bits, etc. to the buffered data. Next, error corrective coding and modulation using correction RAM 27 are carried out. The modulated data are synchronized with the bit clock, and then delivered to the record controller 29. The modulated data are synchronized with the bit clock, and transmit to the record controller 29. The record controller 29 generates laser drive pulses that can form the pit pattern in optical disk 11, and the record controller 29 drives the laser of pickup 12.

In the case of the CAV control, the FG signal from disk motor 13 is transmitted to the disk motor controller 23. Through the disk motor driver 24, rotational speed of the disk motor 13 is controlled to have a constant angular velocity rotational speed, namely, to control the rotational speed of optical disk 11. In the case of the CAV control, a synchronizing signal extracted by the CD data signal processor 26 is transmitted to the disk motor controller 23. Through the disk motor driver 24, rotational speed of the disk motor 13 is controlled to have a constant linear velocity (relative speed between the optical disk 11 and the laser beam) so as to control the rotational speed of optical disk 11.

Figure 5:
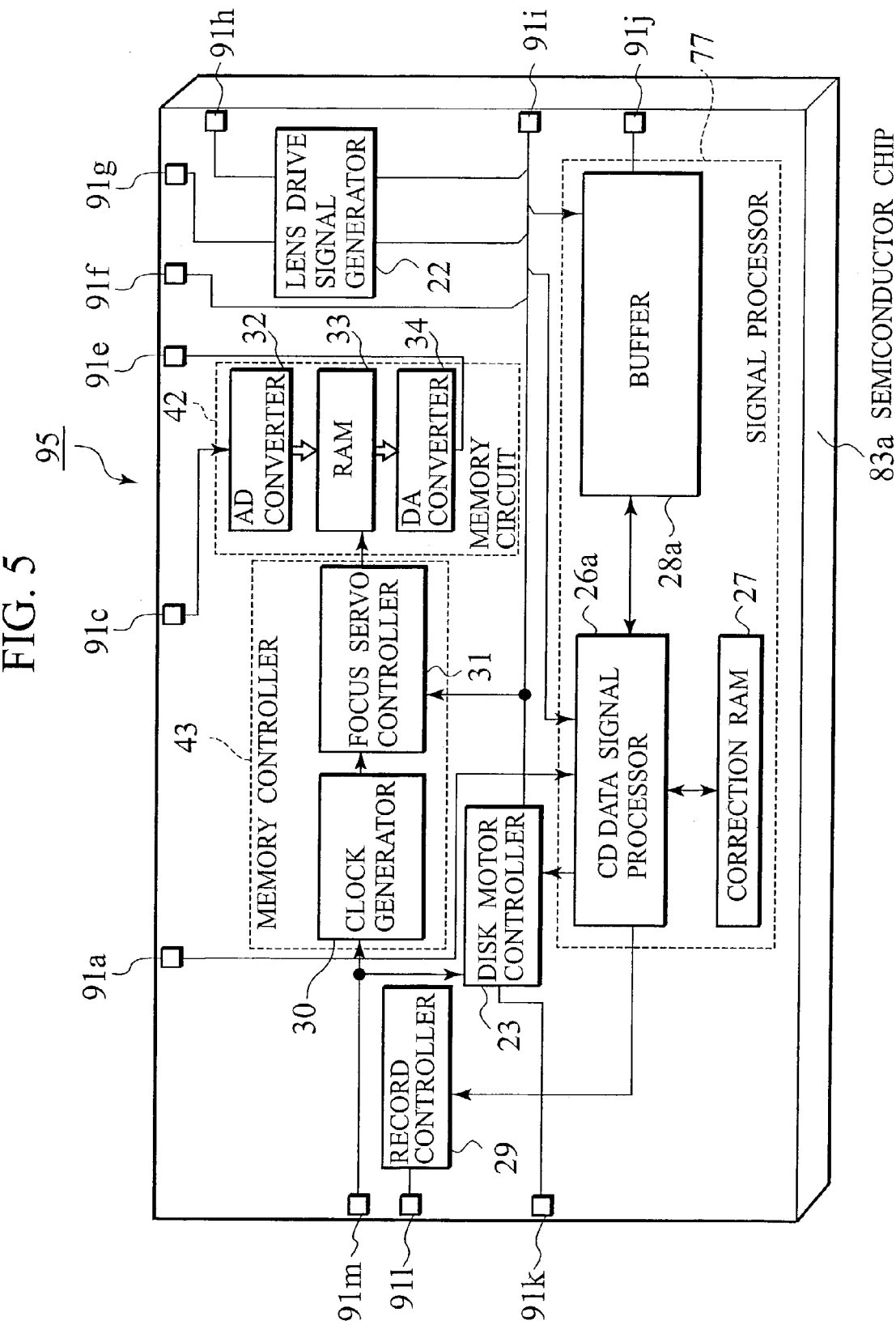
FIG. 5 is a block diagram of composition which integrated a part of the optical disk drive according to the first embodiment of the present invention monolithically on the same semiconductor chip.

As shown in FIG. 5, the memory address controller 51a and the memory circuit 42 in the rotation control circuit 51a can be monolithically integrated so as to form the semiconductor integrated circuit 95 on the same semiconductor chip 83a. Furthermore, the signal processor 77, the lens drive signal generator 22, record controller 29, and the disk motor controller 23 are merged in the semiconductor chip 83a. The semiconductor chip 83a has a bonding pad 91a configured to supply a signal from the CD data signal processor 26a. The semiconductor chip 83a also has a bonding pad 91c configured to supply a signal from the AD converter. A bonding pad 91e is electrically connected to the DA converter 34. A bonding pad 91f is electrically connected to a bonding pad 91i. A bonding pad 91g and a bonding pad 91h are electrically connected to the lens drive signal generator 22. The bonding pad 91i is electrically connected to the signal processor 77, to the disk motor controller 23, to the memory address controller 31, and to the lens drive signal generator 22. A bonding pad 91j is electrically connected to the buffer 28a. A bonding pad 91k is electrically connected to the disk motor controller 23. A bonding pad 91l is electrically connected to record controller 29. A bonding pad 91m is electrically connected to the clock generator 30 and the disk motor controller 23. The semiconductor integrated circuit 95 shown in FIG. 5 is implemented by known CMOS process. More specifically, the bonding pads 91a, 91c, 91e–90m are connected to, for example, a plurality of high impurity concentration regions (source region/drain region) formed in and at the surfaces of active area assigned at the surface of the semiconductor chip 83a, where a donor or an acceptor is doped with a concentration of approximately $1 \times 10^{18}$ to $1 \times 10^{21}$ cm$^{-3}$. A plurality of electrode layers made from a metal such as aluminum (Al) or an aluminum alloy (Al—Si, Al—Cu—Si) are formed so as to implement ohmic contacts with this plurality of high impurity concentration regions. On the top surface of such a plurality of electrode layers, a passivation film such as an oxide film (SiO$_2$), a phosphosilicate glass (PSG) film, a boro-phosphosilicate glass (BPSG) film, a nitride film (Si$_3$N$_4$), or a polyimide film, is deposited.

A plurality of openings (contact holes) are delineated in a portion of the passivation film so as to expose a plurality of electrode layers, implementing the bonding pads 91a, 91c, 91e–90m. Alternatively, the bonding pads 91a, 91c, 91e–90m may be formed as other metal patterns connected to a plurality of electrode layers by using metal wiring. In addition, it is possible to form bonding pads 91a, 91c, 91e–90m on the polysilicon gate electrodes using a metal film such as aluminum (Al) or an aluminum alloy (Al—Si, Al—Cu—Si). Alternatively, a plurality of other bonding pads may be connected, via a plurality of signal lines such as gate wirings, to the polysilicon gate electrodes. Instead of polysilicon, gate electrodes made of a refractory metal such as tungsten (W), titanium (Ti), or molybdenum (Mo), a silicide (i.e. $WSi_2$, $TiSi_2$, $MoSi_2$), or a polycide containing any of these silicides can be used.

Figure 6:
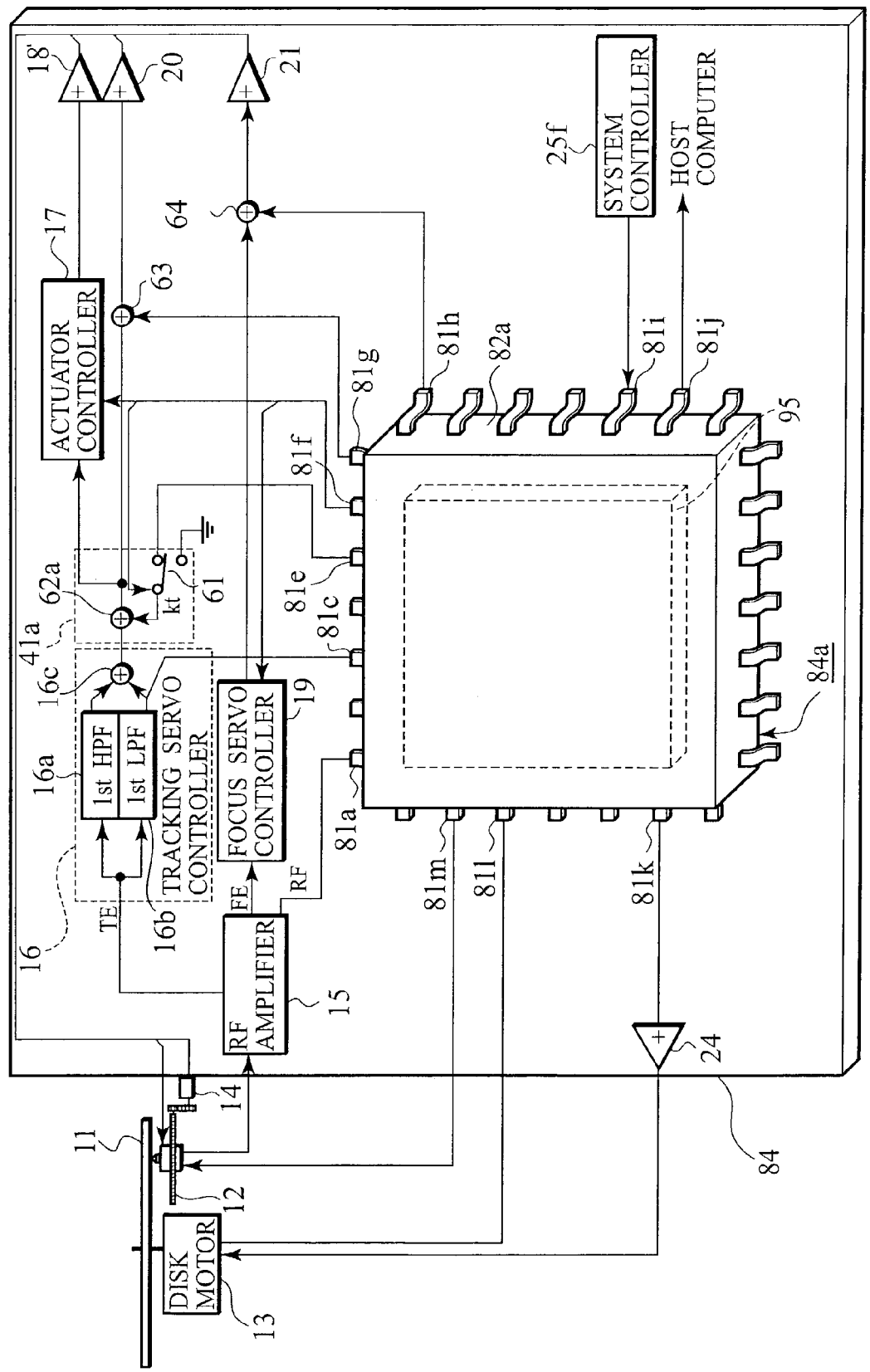
FIG. 6 is a mounting example of the semiconductor integrated circuit according to the first embodiment of the present invention.

As shown in FIG. 6, the semiconductor integrated circuit 95 shown in FIG. 5 is covered by a mold resin, and a packaged semiconductor integrated circuit 84a is formed. A disk motor terminal 81k is connected to the bonding pad 91k. A pickup terminal 81l is connected to the bonding pad 91l. A FG terminal 81m is connected to the bonding pad 91m. A RF terminal 81a is connected to the bonding pad 91a. A low-pass filter terminal 81c is connected to the bonding pad 91c. A memory output terminal 81e is connected to the bonding pad 91e. An actuator terminal 81f is connected to the bonding pad 91f. A tracking terminal 81g is connected to the bonding pad 91g. A focus terminal 81h is connected to the bonding pad 91h. A system controller terminal 81i is connected to the bonding pad 91i. A data output terminal 81j is connected to the bonding pad 91j. Moreover, the RF terminal 81a is connected to the RF amplifier 15. The FG terminal 81m is connected to the disk motor 13. The low-pass filter terminal 81c is connected to the tracking servo controller 16. The memory output terminal 81e is connected to the compensation signal adder 41a. The actuator terminal 81f is connected to the actuator controller 17. The tracking terminal 81g is connected to the adder 63. The focus terminal 81h is connected to the adder 64. The system controller terminal 81i is connected to the system controller 25f. The data output terminal 81j is connected to a host computer.

Figure 7A:
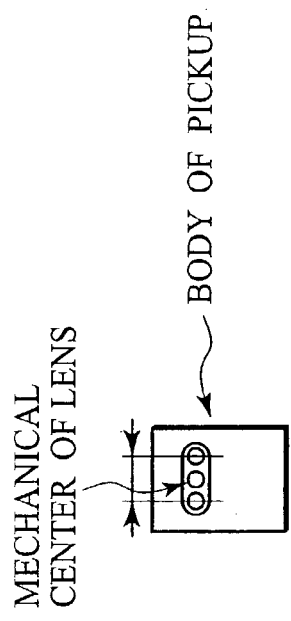
FIG. 7A is a schematic diagram of the pickup body.
Figure 7B:
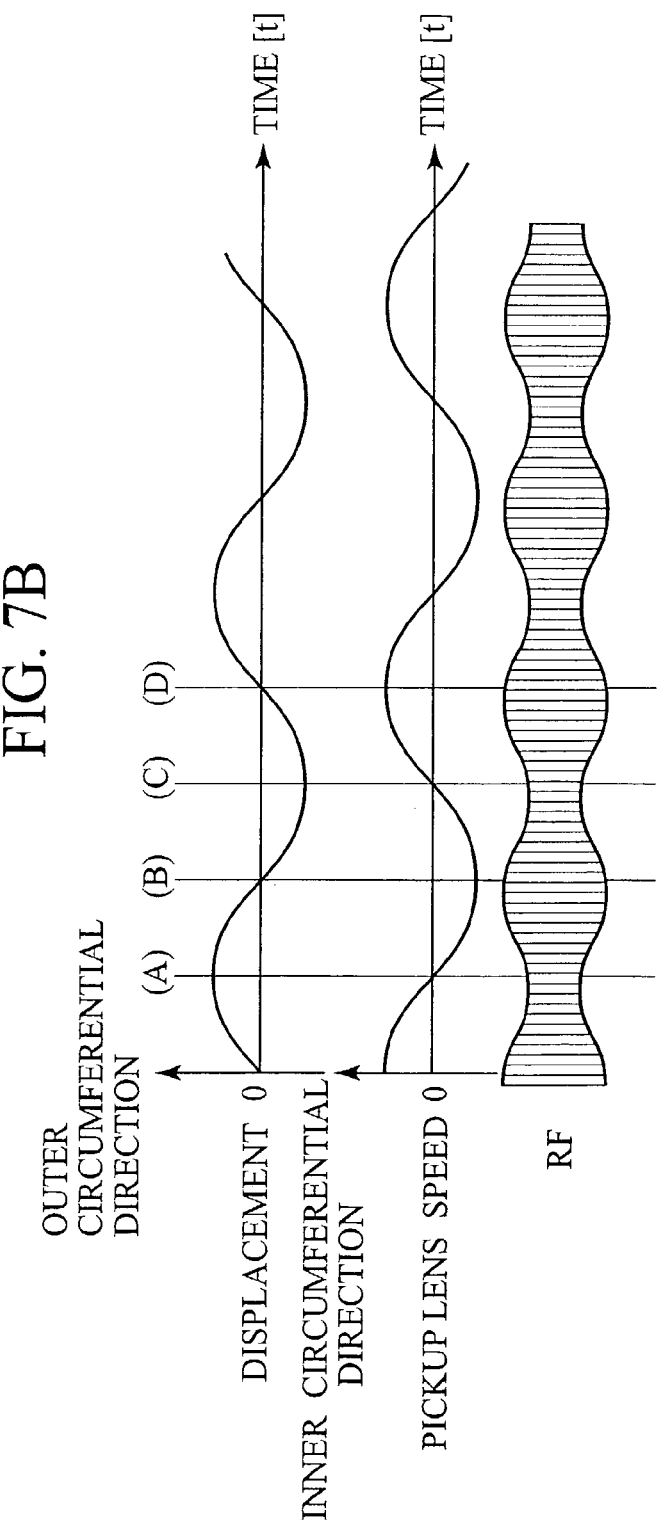
FIG. 7B is a time chart showing the tracking operation.
Figure 8:
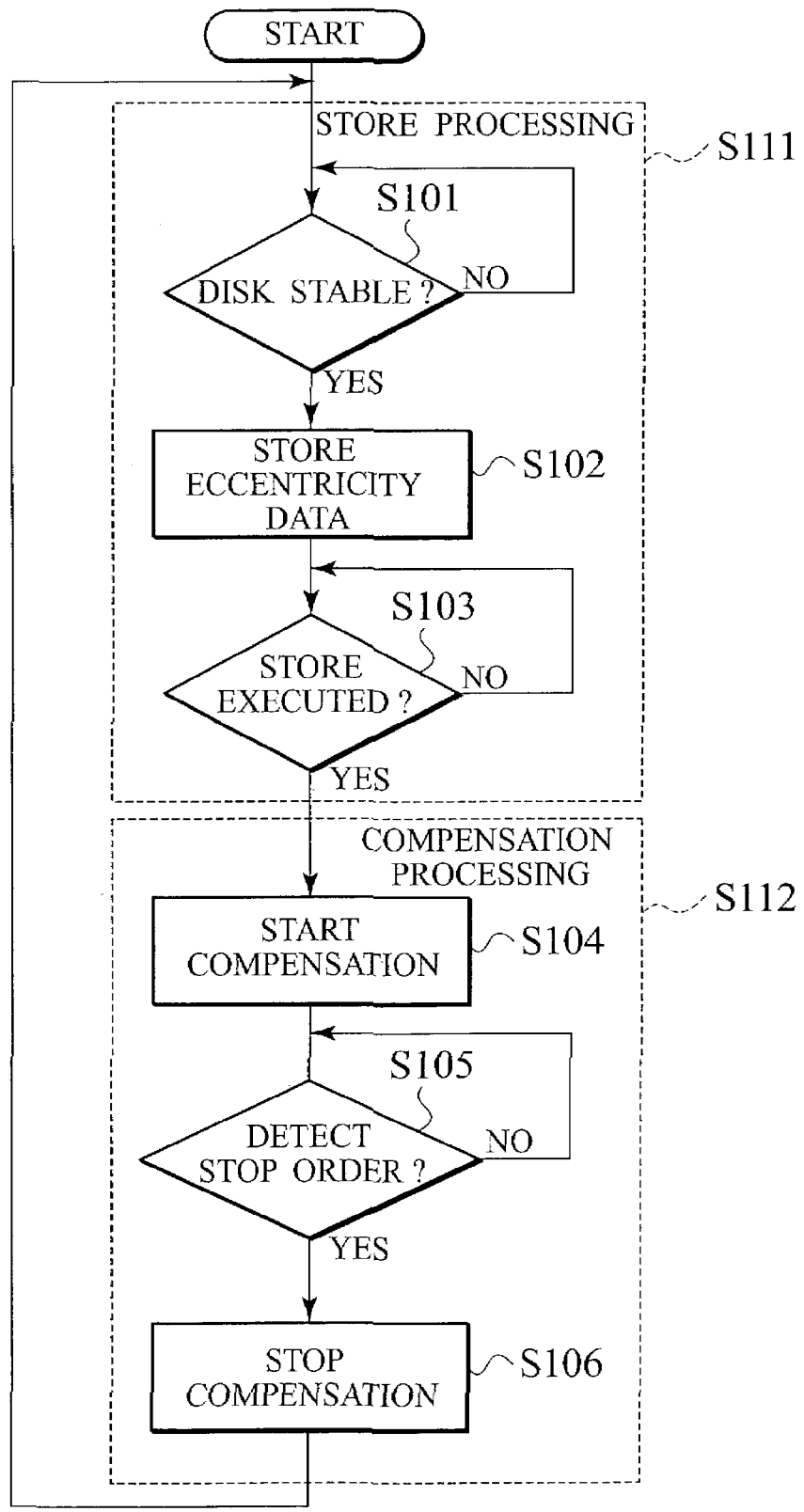
FIG. 8 is a flowchart showing a method for controlling the rotation according to the first embodiment of the present invention.

FIG. 7A and FIG. 7B shows the state of reproduction and recordation operation of the eccentric optical disk 11. In a point (A), the lens considerably shifts to the periphery. In a point (B), though the lens is mechanically centrally positioned, the speed is high because the lens moves in the inner circumference direction. In a point (C), the lens is shifting in the inner circumference direction, and speed of the lens is sufficiently slow. In a point (D), the lens moves at high speed in the outer circumferential direction. The lens shifts along the outer and inner circumferential directions in the point (A) and the point (C), the beam slightly inclines from a perpendicular angle with respect to the disk. In the point (A) and (C), the lens shift along the outer and inner circumferential directions is largest, the beam slightly leans toward the perpendicular angle of the disk. Therefore, the RF signal slightly decreases. The sufficient amplitude of the RF signal is obtained in the point (B) and the point (D) because the lens is positioned in the mechanical center. The RF signal is modulated to amplitude modulation (AM) by the operation mentioned above, and the error rate of the data increases. By a position on the optical disk, success probability of track jump is different. Success probability of the track jump can be an important feature influencing the performance of the optical disk drive, since the seek time is directly affected. Moreover, tracking range is about 1 mm in the case of a general lens. The rotation control circuit 51a stores displacement information of eccentricity of the optical disk 11 in the memory circuit 42, and memory circuit 42 adds the displacement information of the eccentricity to the pickup control signal.

Next, the operation of the rotation control circuit 51a according to the first embodiment of the present invention is explained using FIGS. 1–4, FIG. 8, and FIGS. 9A–9E.

Figure 9:
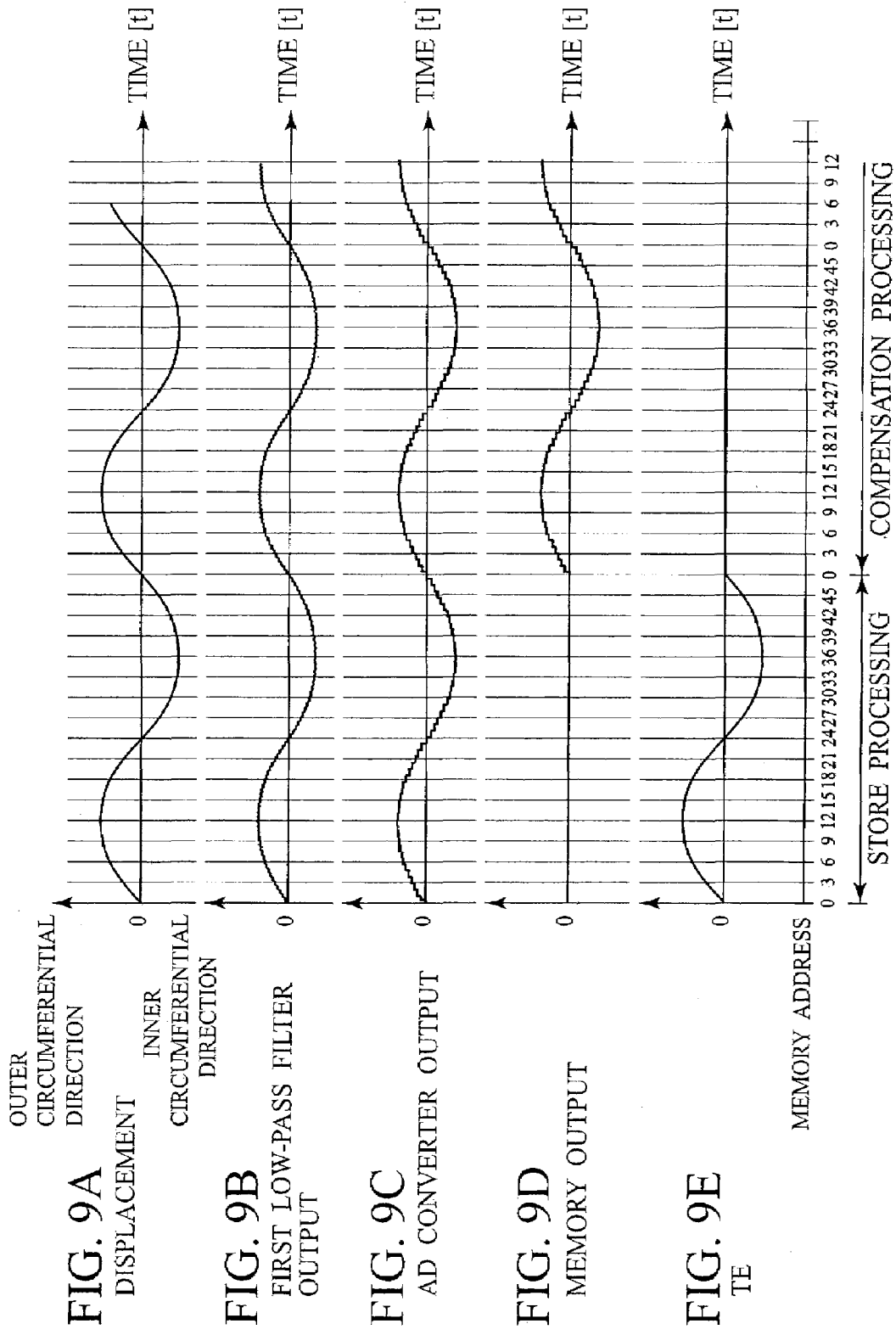
FIGS. 9A–9E are time charts showing the operation of the rotation control circuit according to the first embodiment of the present invention.

(A) To begin with, the disk motor 13 drives the optical disk 11. For example, as shown in FIG. 9A, the pickup 12 detects the sinusoidal displacement for the effect of the eccentricity of the optical disk 11 in the tracking direction (horizontal direction of the optical disk 11). That is to say, the pickup lens repeats the transfer along the outer or inner circumference direction of the optical disk 11 from the mechanical center. The RF amplifier 15 amplifies the displacement information, and generates a tracking error signal TE. The tracking error signal TE is transmitted to the first high-pass filter 16a and the first low-pass filter 16b. The first low-pass filter 16b remove the noise of the tracking error signal TE. As shown in FIG. 9B, the first low-pass filter generates the displacement of optical disk 11 tracking direction, namely, "eccentricity data".

(B) The clock generator 30 improves the resolution of the FG signal supplied from the disk motor 13. Recently, the motor used in the optical disk 11 is mainly a hall motor. The hall motor generates the FG signal by hall sensors in the hall motor. Therefore, the pole numbers per one revolution are 6–18 poles, and the resolution of the FG signal is low. The clock generator 30, synchronizing with the FG signal provided by the disk motor 13, generates a high frequency multiplied clock. When the control of the disk motor is by CAV, the angular velocity of the rotation is fixed. In the case of the CAV control, for example, clock generator 30 is designed so that a clock signal is generated for every one clock by rotating 1°. The clock signal generated by the clock generator 30 is transmitted to the memory address controller 31. In step S101 shown in FIG. 8, the stable state judgment portion 25b shown in FIG. 4 judges whether the rotational frequency of the disk motor 13 is steady state or not. When the rotational frequency is not steady state, exact information of the eccentricity cannot be provided by the first low-pass filter 16b.

(C) When the rotational frequency is judged as the steady state by the steady states judgment portion 25b at step S101, the control advances to step S102. Next, at step S102, timing controller 25a shown in FIG. 4 instructs memory address controller 31 to store the eccentricity data corresponding to one revolution of the optical disk 11. The memory address controller 31 generates a memory address control signal. As a result, synchronizing with the clock generated by the clock generator 30, the output signal of the low-pass filter 16b, namely, the eccentricity data of one revolution of the optical disk 11 is stored in the RAM 33. The RAM 33 stores the eccentricity data of every 2–4° of rotation of the optical disk 11 based on the memory address control signal. The memory address controller 31 judges the end of one revolution by counting the clock provided by the clock generator 30. For example, when the clock generator 30 generates 1° of the rotation of the optical disk 11 by the 1 clock, 360 clocks are counted, and the memory stops storing the eccentricity data. For example, when the clock generator 30 generates one clock by 1° of the rotation of the optical disk 11, 360 clocks are counted, and the memory stops storing the eccentricity data. The first switch circuit 61a is in an OFF state. At step S103, when the eccentricity data of the one revolution minute of the optical disk 11 was stored in RAM 33, the process advances to step S104.

(D) As shown in FIG. 9D, the output signal of the RAM 33 is converted into an analog signal by DA converter 34. FIG. 9D shows the output signal of the DA converter 34 in a rotation compensation step, however the DA converter actually generates a continuous signal. At step S104, using the eccentricity data of the one revolution minute of the optical disk 11 stored in the RAM 33 starts the rotation compensation. The timing controller 24a in the system controller 25f turns on the first switching circuit 61a, and the rotation compensation starts. By turning on the first switching circuit 61a, the output signal of the DA converter 34 is added to the pickup control signal provided by the tracking servo controller 16 at the first adder 62a.

(E) Next, at step S105, the process advances to step S106 when the stable state judgment portion 25b shown in FIG. 4 detected the generation of an extraordinary condition or the stop command detector 25c detected a stop command of the rotation compensation. In step S106, the first switching circuit 61a is turned off, and the rotation compensation ends. Here, "extraordinary condition" means the condition that the damper (not illustrated) fixing the optical disk 11 slips or the conditions that dust etc. are adhered to the surface of the optical disk 11. The processing returns to step S101, after the rotation compensation completes at step S106.

With the rotation control circuit 51a according to the first embodiment, an optical disk having a large eccentricity can be reproduced. Moreover, it is possible to sufficiently obtain the gain of the tracking servo controller 16. Therefore, good tracking servo characteristics of the pickup 12 is obtained, even if the rotational frequency of the optical disk 11 increases. In addition, the pickup 12 can stably carry out track jump. The rotational speed of optical disk 11 may change during the steps of storing/reading, since the memory circuit 42 carries out the storing/reading in synchronization with the FG signal generated by disk motor 13. By merging a part of the optical disk drive according to the first embodiment of the present invention on a semiconductor integrated circuit 84a, miniaturization and decreased weight of the entire optical disk drive can be achieved. Therefore, the semiconductor integrated circuit 84a is effective in an optical disk drive such as a portable DVD player.

Figure 10:
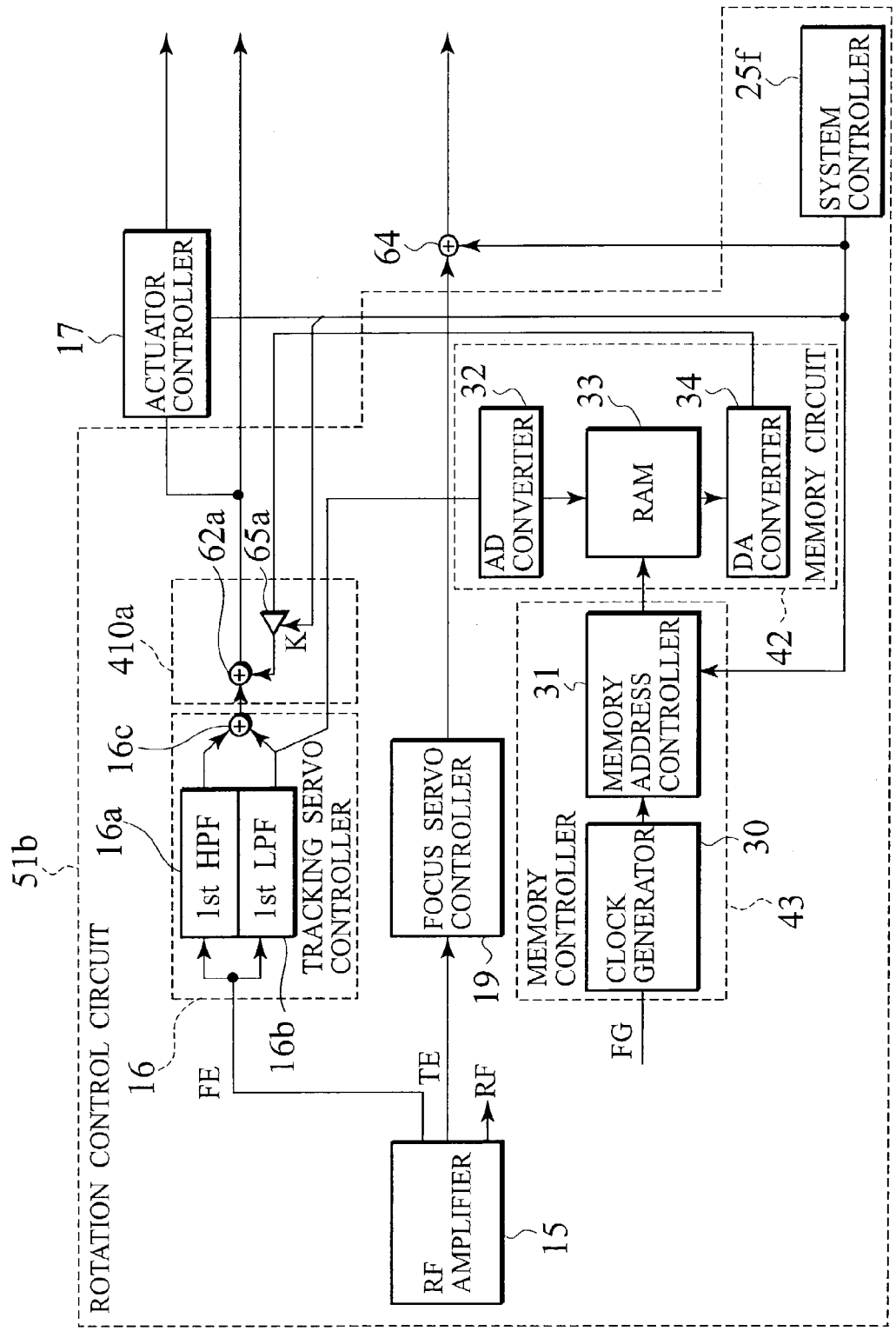
FIG. 10 is a block diagram of a rotation control circuit according to the modification of a first embodiment of the present invention.

As shown in FIG. 10, a rotation control circuit 51b according to the modification of the first embodiment of the present invention has a first compensation signal adder which includes a first adder 62a connected to the tracking servo controller 16, and a first amplifier 65a connected to the first adder 61a. The output side of memory circuit 42 is connected to the input side of the first amplifier 65a. The first switch circuit 41a shown in FIG. 1 was explained such that the first switch circuit 41a can only choose ON and OFF in adding the compensation signal (eccentricity data) to the pickup control signal. However, the compensation signal creates a disturbance when the compensation signal read out from memory circuit 42 is suddenly added to the pickup control signal, and then servo deviation, etc. may be caused. When the eccentricity data stored in RAM 33 is added to the zero cross point of the pickup control signal the compensation signal does not become the disturbance. However, it is difficult to store data and to start adding in synchronism with the zero cross point. Therefore, as shown in FIG. 11C, when amplification factor K of the first amplifier 65a is gradually raised, without creates a compensation signal as a disturbance, it is possible to add the compensation signal to the pickup control signal. Amplification factor K of the first amplifier 65a is variable. Therefore, it is possible that the amplification factor K is zero. The system controller 25f shown in FIG. 4 controls the amplification factor K. That is to say, when the signal like FIG. 11A was provided from RAM 33 the compensation signal becomes a signal shown in FIG. 11B as a result of gradually amplifying from the amplification factor K=zero. When the compensation stops, the first adder 65a gradually decreases until amplification factor K=zero. Therefore, it is possible to freely start or stop adding without limiting storage and readout timing of the data to the RAM 33. Therefore, the compensation operation is always turned on during seek operation.

(Second Embodiment)

Figure 12:
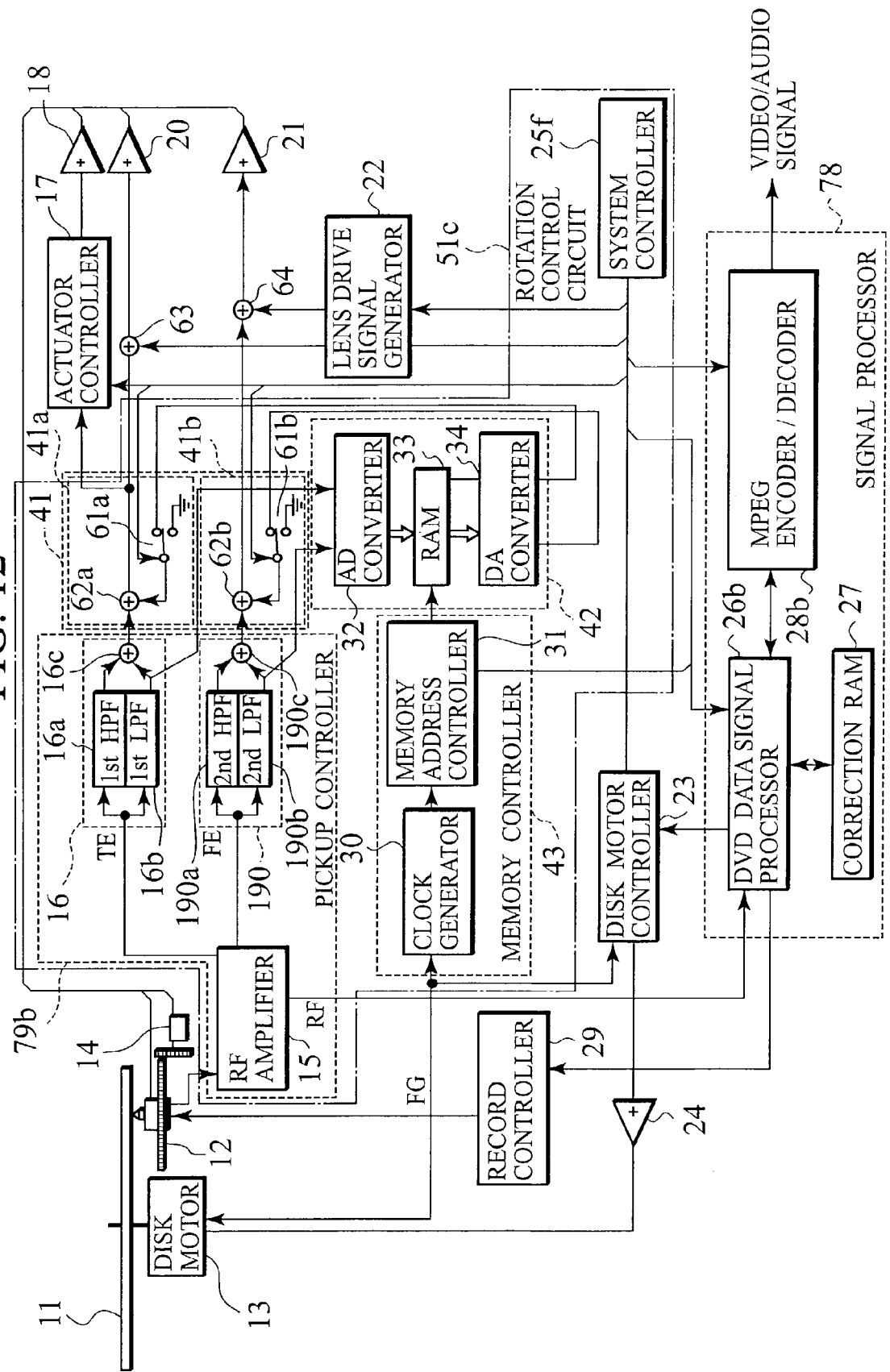
FIG. 12 is a block diagram of an optical disk drive according to a second embodiment of the present invention.

As shown in FIG. 12, a rotation control circuit 51c according to a second embodiment of the present invention includes a pickup control circuit 79b having the RF amplifier 15 connected to the pickup 12, the tracking servo controller 16, and a focus servo controller 190 having an input side connected to the RF amplifier 15 and an output side connected to the memory circuit 42. The focus servo controller 120 shown in FIG. 12 includes a second low-pass filter 190b connected to the RF amplifier 15, a second high-pass filter 190a connected to the RF amplifier 15, and an adder 190c having one terminal connected to the second low-pass filter 190b, another terminal connected to the second high-pass filter 190a. An output side of the tracking servo controller 16 is connected to a second compensation signal adder 41b. The second compensation signal adder 41b includes a second adder 62b connected to the focus servo controller 190, a second switch circuit 61b connected between the second adder 62b and the memory circuit 42. A signal processor 78 can reproduce and record the DVD.

Figure 13A:
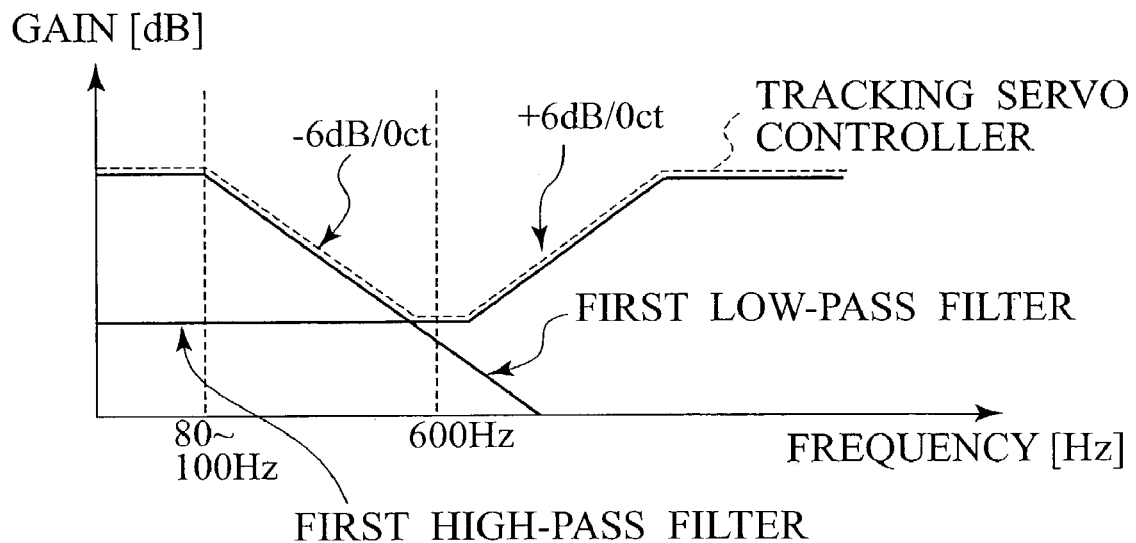
FIG. 13A shows a frequency characteristic of a tracking servo controller according to the second embodiment of the present invention.
Figure 13B:
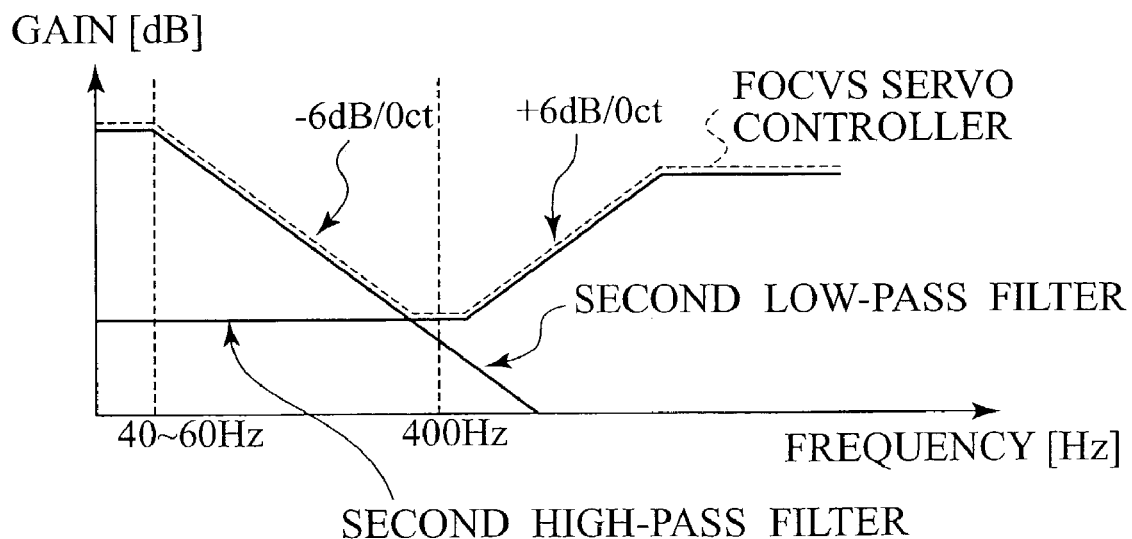
FIG. 13B shows a frequency characteristic of a focus servo controller according to the second embodiment of the present invention.

The configuration of the focus servo controller 190 is similar to the configuration of the tracking servo controller 16 shown in FIG. 2. However, frequency characteristics are different between the focus servo controller 190 and the tracking servo controller 16, as shown in FIG. 13A and FIG. 13B. The difference originates from characteristics of pickup 12. Concretely, compared with the first low-pass filter 16b, as shown in FIG. 13A and FIG. 13B, the second low-pass filter 190b sets the cut-off frequency low, and sets the gain high. In addition, compared with the first high-pass filter 16a, the second high-pass filter 190a sets the cut-off frequency low. The RAM 33 of memory circuit 42 stores both the output signal of the first low-pass filter 16b and the output signal of the second low-pass filter 190b.

Figure 14:
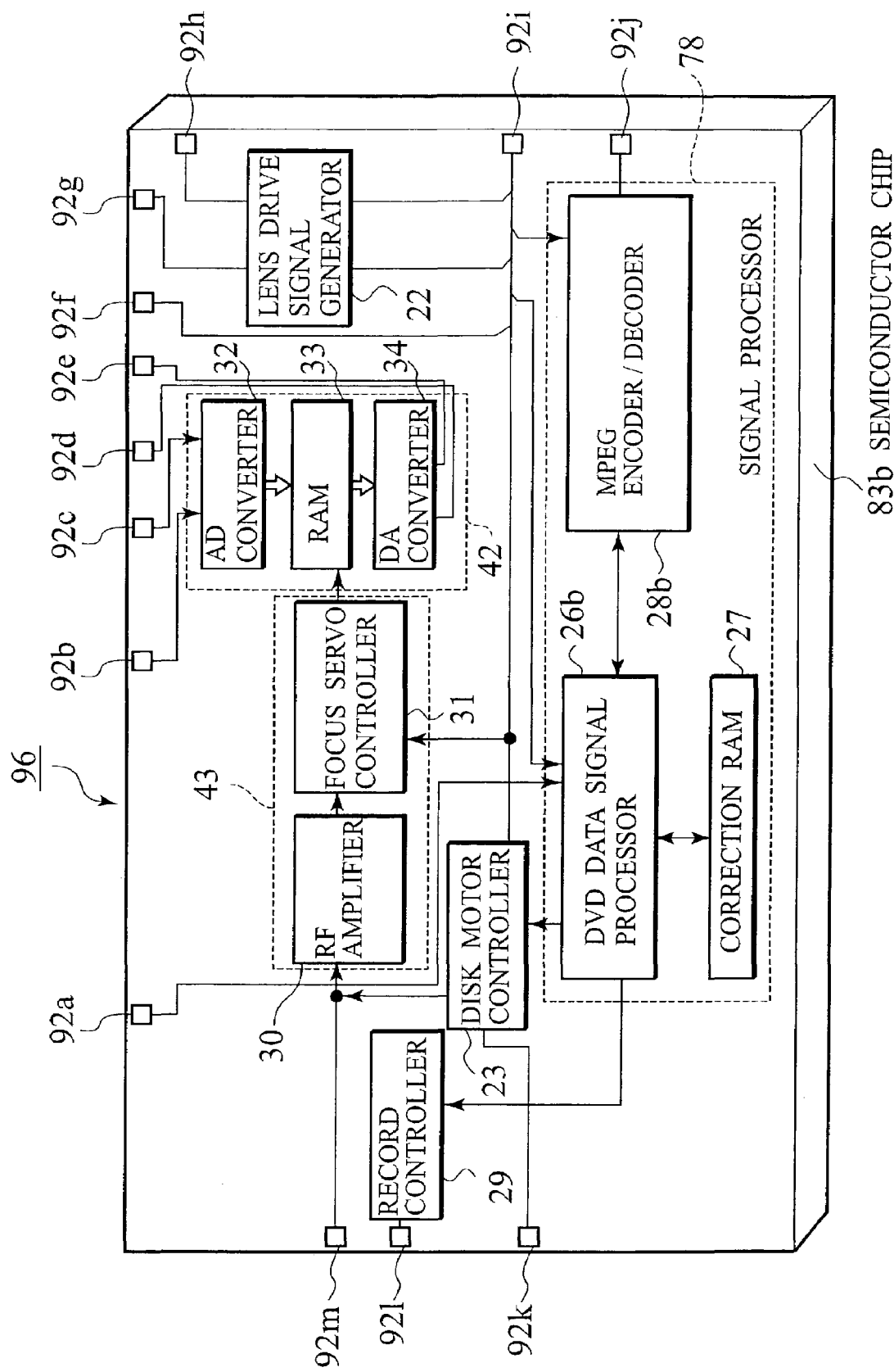
FIG. 14 is a block diagram of composition which integrated a part of the optical disk drive according to the second embodiment of the present invention monolithically on the same semiconductor chip.
Figure 15:
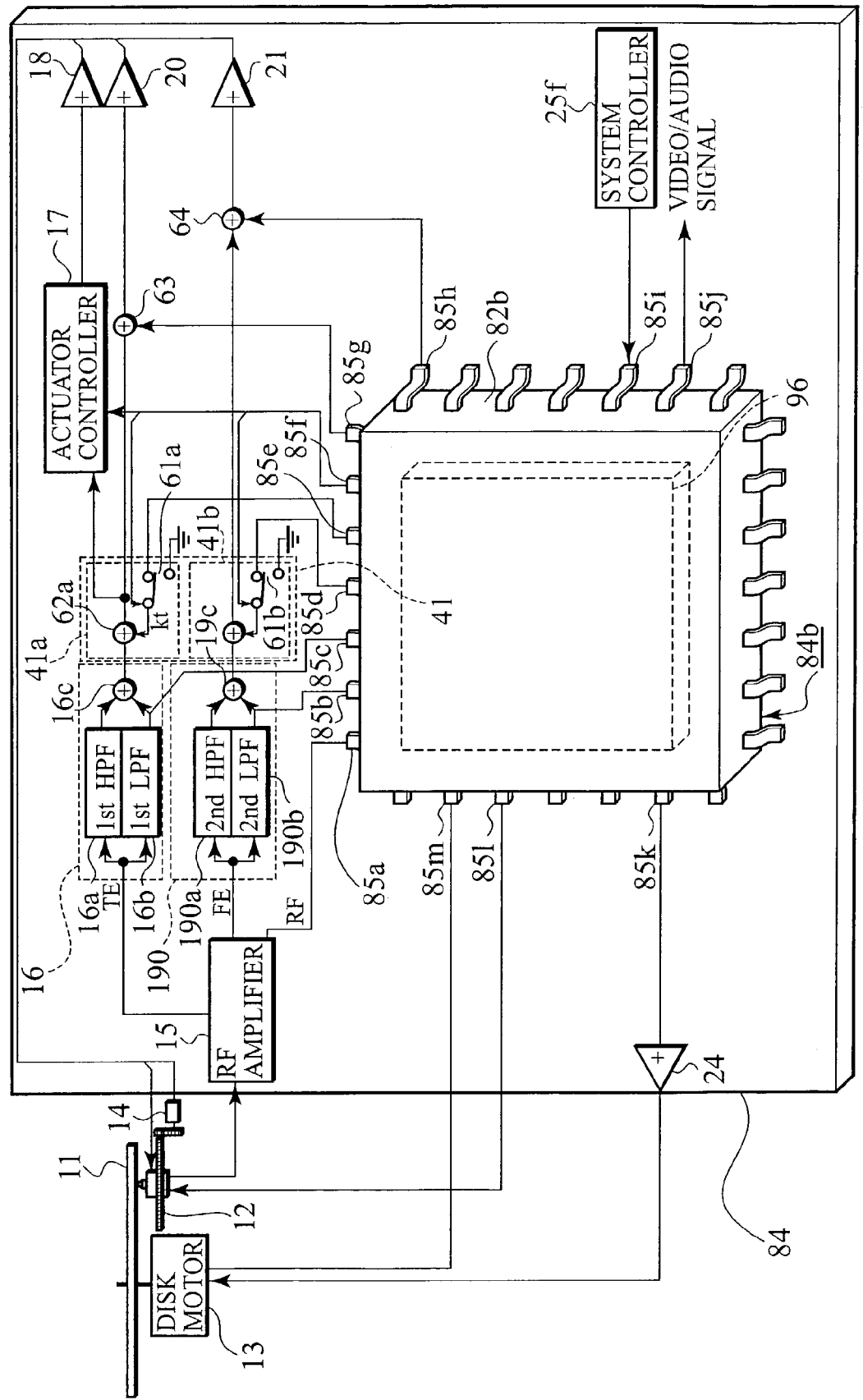
FIG. 15 is a mounting example of the semiconductor integrated circuit according to the second embodiment of the present invention.

The data signal after demodulation and error correction is decoded in the regeneration of the DVD data signal processing circuit 26 in decoder division of MPEG encoder/decoder 28 based on the MPEG2 standard. Then, the original video signal and audio signal are reproduced. The video, audio signal transmitted from an outside source, in the case of recording, is condensed and is encoded in encoder division of MPEG decoder/encoder 28 based on the MPEG2 standard. As a result, the encoded data is generated. The encoded data is transmitted to the DVD signal processor. By using correction RAM 27 in the DVD signal processor 26b, error corrective coding and modulation are conducted. In addition, signal processor 78 of a semiconductor integrated circuit 96—which is merged in a single chip—according to the second embodiment of the present invention has a configuration reproducing and recording a DVD, as shown in FIG. 14. A bonding pad 92b and a bonding pad 92c are connected with the AD converter 32 of the memory circuit 42. A bonding pad 92d and a bonding pad 92e are connected with the DA converter 34 of the memory circuit 42. A bonding pad 92j is connected with the MPEG encoder/decoder 28b of the signal processor 78. As shown in FIG. 15, a focus low-pass filter terminal is connected with the bonding pad 92b. A second memory output terminal is connected with the bonding pad 92d. A video output terminal is connected with the bonding pad 92j.

The semiconductor integrated circuit 96 of the chip shown in FIG. 14 is covered by a mold resin 82b, as shown in FIG. 15, and becomes a packaged semiconductor integrated circuit 84b. The focus low-pass filter terminal 85b is connected to an output side of the second low-pass filter 190*b*. The second memory output terminal 85*d* is connected to the second compensation signal adder 41*b*. The other elements are similar to the semiconductor integrated circuit 84*a* shown in FIG. 6.

Figure 16A:
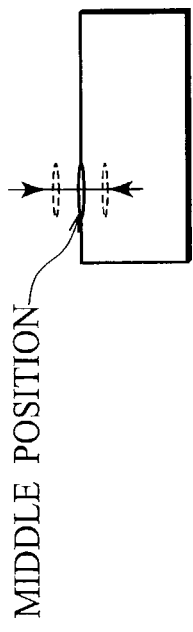
FIG. 16A is a schematic diagram of a focus lens.
Figure 16B:
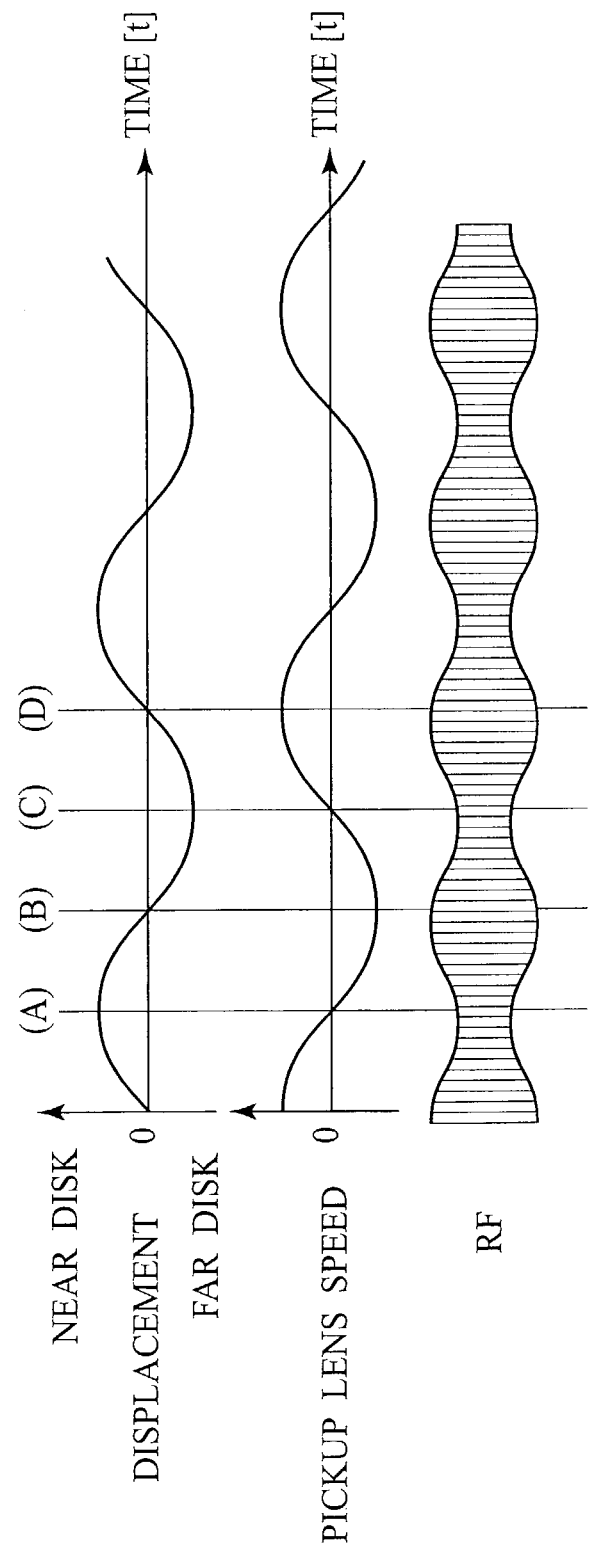
FIG. 16B is a time chart showing the focus operation.
Figure 17:
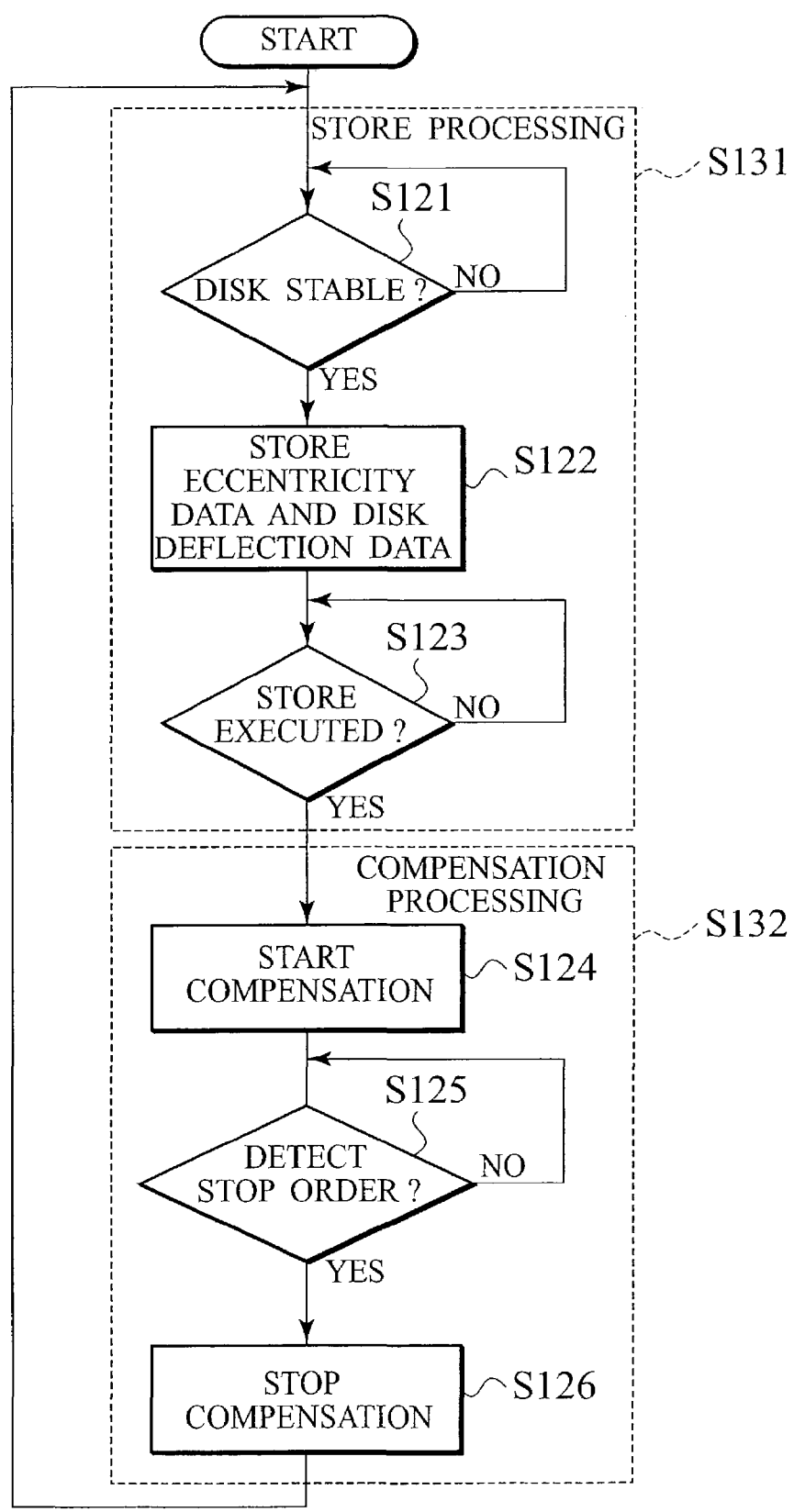
FIG. 17 is a flowchart showing a method for controlling the rotation according to the first embodiment of the present invention.

FIG. 16A and FIG. 16B show the states of layer jumps at (A), (B), (C), and (D) points of a DVD having two layers. By the disk deflection etc., the lens traces the track, vibrating sinusoidally along the upper and lower directions. In the point (A), the lens shifts considerably from the middle position to the upper position, and speed of the lens is sufficiently slow. In the point (B), the lens shifts to the lower position, and speed of the lens is very high. In the point (C), the lens is the lower position, and speed of the lens is slow. In the point (D), the lens shifts to the upper position, and lens is in the middle position. Unlike the tracking servo system, the effect of the gravity affects against the layer jump in the horizontal optical disk drive configuration. In case of the focus system, similar to the tracking system, gain of the RF signal becomes minimum at points (A) and (C), and it becomes a maximum at point (B) or (D). As a result, the disk and the beam deviate from the vertical, and the RF amplitude is decreased. The lowering of the RF amplitude affects the reading rate of the data. The data reading condition of the focus system is more severe than the condition of the tracking system so that the gradient components of the disk may cause a decrease of the direct reflected light quantity. It is also a problem for the DVD having two layers for a layer jump that moves from one layer to another layer except for the problem of the error rate of the data. That is to say, the probability of the layer jump is decreased by rapid disk deflection.

Next, the operation of the rotation control circuit 51*c* according to the second embodiment of the present invention is explained using FIG. 4, FIGS. 9A–9E, FIG. 17, and FIGS. 18A–18E. However, description of the operation which is similar to the first embodiment of the present invention is omitted.

(A) To begin with, as shown in FIG. 9A and FIG. 18A, sinusoidal displacement in the tracking direction and focus direction are generated by effect of the eccentricity and the disk deflection between the pickup 12 and the optical disk 11. The RF amplifier 15 amplifies the displacement information, and generates the tracking error signal TE and the focus error signal FE. Tracking error signal TE and focus error signal FE are fed into tracking servo controller 16 and focus error controller 190 respectively.

(B) Next, the first low-pass filter 16*b* remove the noise of the tracking error signal TE. As shown in FIG. 9B, the first low-pass filter 16*b* generates the eccentricity data. As shown in FIG. 18B, the second low-pass filter 190*b* generates the displacement of optical disk 11 focus direction, namely, "disk deflection data". An output signal of the first low-pass filter 16*b* and an output signal of the second low-pass filter 190*b* are fed into AD converter 32. As shown in FIG. 9C and FIG. 18C, the AD converter converts the output signal of the first low-pass filter 16*b* and the output signal of the second low-pass filter 190*b* into analog signal.

(C) Next, the clock generator 30 generates high frequency clock for improving the resolution of the FG signal supplied from the disk motor 13. When the rotational frequency is judged as the steady state by the steady states judgment portion 25*b* at step S121 shown in FIG. 17, the RAM 33 stores the eccentricity data and the disk deflection data of one revolution of optical disk 11. Here, the timing of the storing of eccentricity data and disk deflection data to RAM 33 are mutually independent. Or, the timing of the storing of the eccentricity data and the disk deflection data to RAM 33 are at the same time for the simplification of the processing of the system controller 25*f*. Next, the eccentricity data and the disk deflection data are stored in the RAM 33 in synchronism with the clock signal generated by the clock generator 30. At step S123, it is judged whether the eccentricity data and the disk deflection data for the one revolution of optical disk 11 is stored in the RAM 33 or not. When the eccentricity and disk deflection data are judged to be stored in the RAM 33 the process advances to step S124.

(D) Next, at step S104, using the eccentricity data and the disk deflection data for the one revolution of the optical disk 11 stored in RAM 33, the rotation compensation starts. The timing controller 24*a* in system controller 25*f* turns on the first switching circuit 61*a* and the second switching circuit 61*b*, the rotation compensation starts. For example, the timings of the turning on the first switching circuit 61*a* and the second switching circuit 61*b* are the same time.

(E) Next, at step S125, the process advances to step S126 when the stable state judgment portion 25*b* shown in FIG. 4 detected the generation of the extraordinary condition or the stop command detector 25*c* detected the stop command of the rotation compensation. In step S126, the first switching circuit 61*a* and the second switching circuit 61*b* are turned off, and the rotation compensation completes.

The rotation control circuit 51*c* according to the second embodiment can reduce residual error of not only tracking servo controller 16 but also focus servo controller 190, as mentioned above. In addition, it is possible to obtain sufficient the gain of the focus servo controller 190. Therefore, a good focus servo characteristic of the pickup 12 is obtained, even if the rotational frequency of the optical disk 11 having the disk deflection increases. Therefore, the pickup 12 can stably carry out both track jump and layer jump.

(Third Embodiment)

Figure 19:
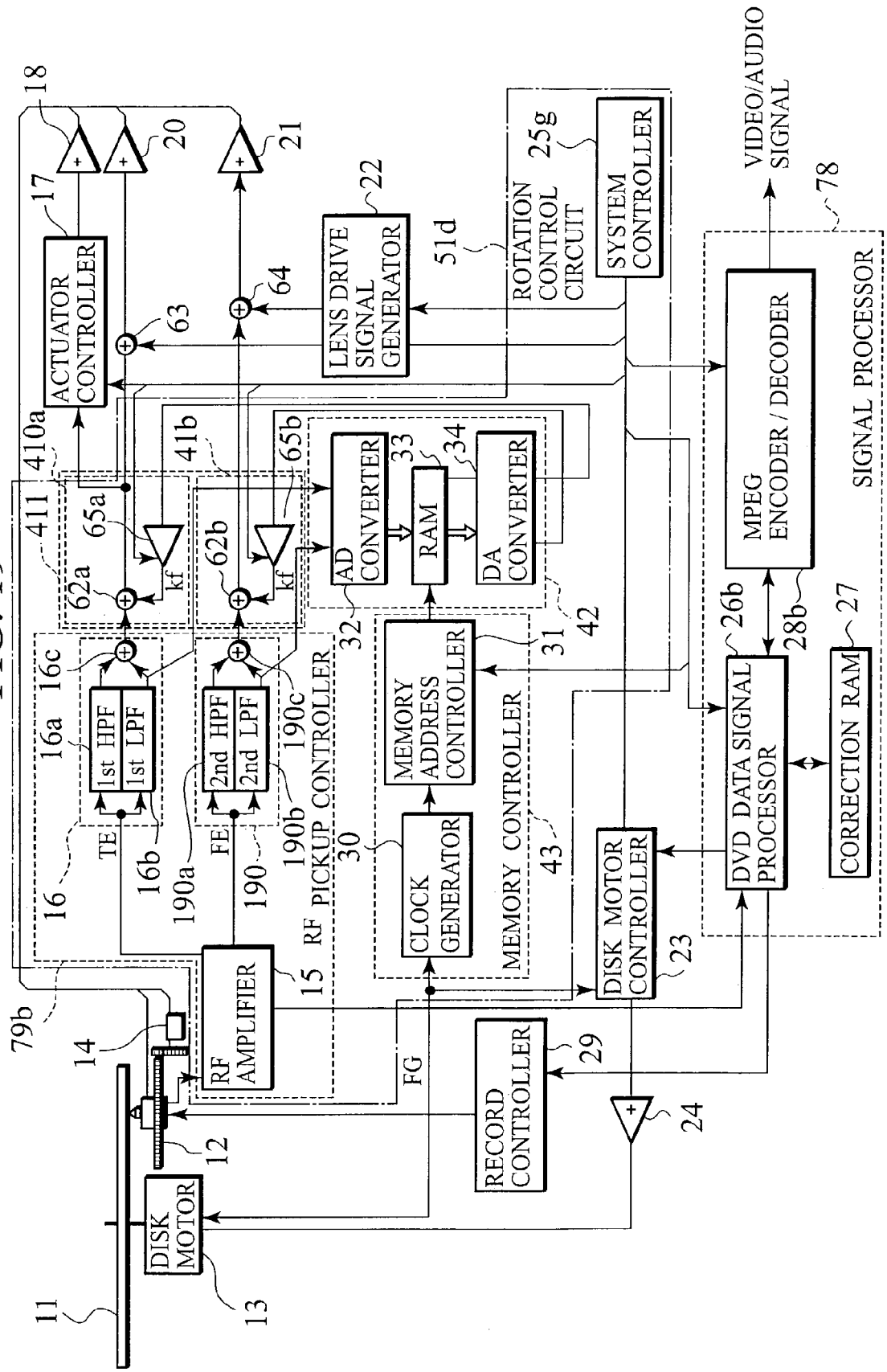
FIG. 19 is a block diagram of an optical disk drive according to a third embodiment of the present invention.

As shown in FIG. 19, the configuration of the focus servo controller 190 is similar to the configuration of the focus servo controller 16 shown in FIG. 10. A compensation signal adder 411 includes a first compensation signal adder 410*a*, and a second compensation signal adder 410*b*. The first compensation signal adder 410*a* includes a first adder 62*a* connected to an output side of the tracking servo controller 16, and a first amplifier 65*a* connected to the first adder 62*a*. An input side of the first amplifier 65*a* is connected to an output side of the memory circuit 42. The second compensation signal adder 410*b* includes a second adder 62*b* connected to an output side of the focus servo controller 190, and a second amplifier 65*b* connected to the second adder 62*a*. An input side of the second amplifier 65*b* is connected to an output side of the memory circuit 42.

Figure 20:
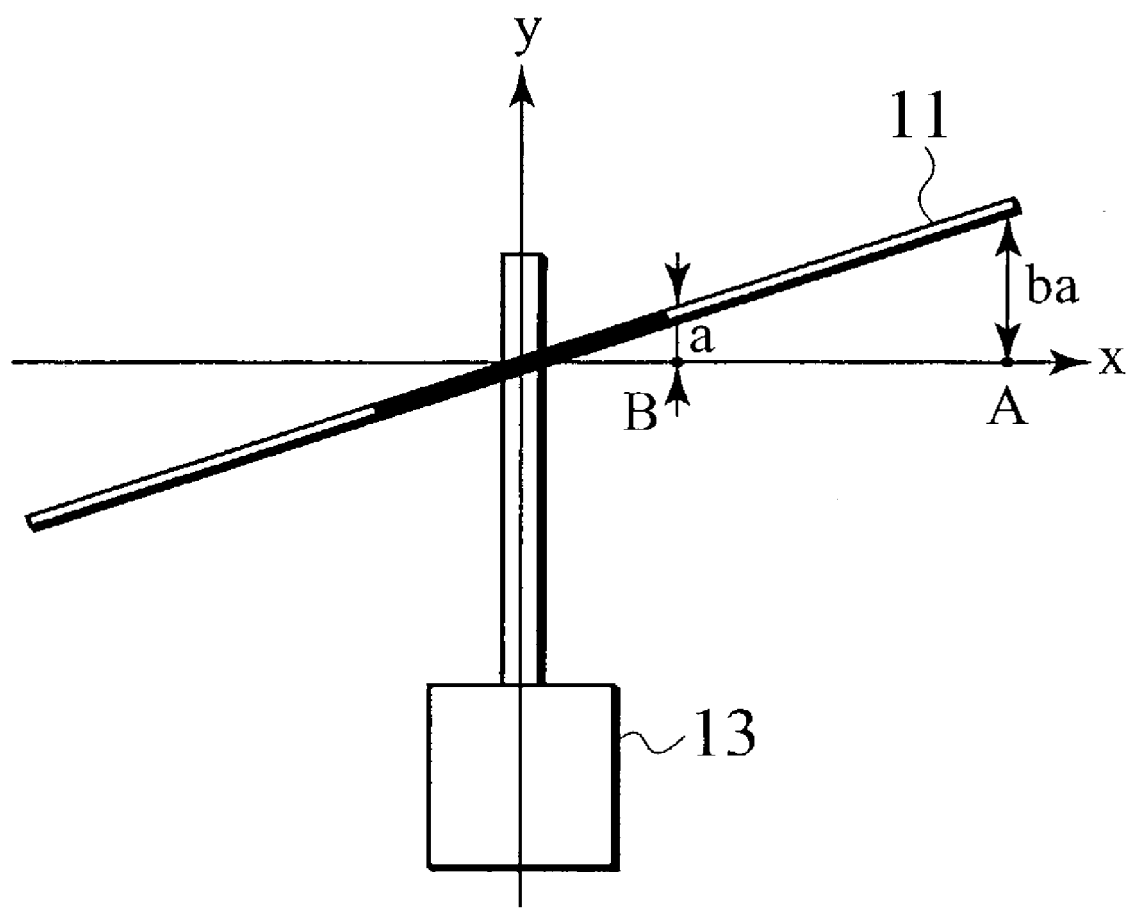
FIG. 20 is a schematic diagram showing a condition of a optical disk having large disk deflection.
Figure 21:
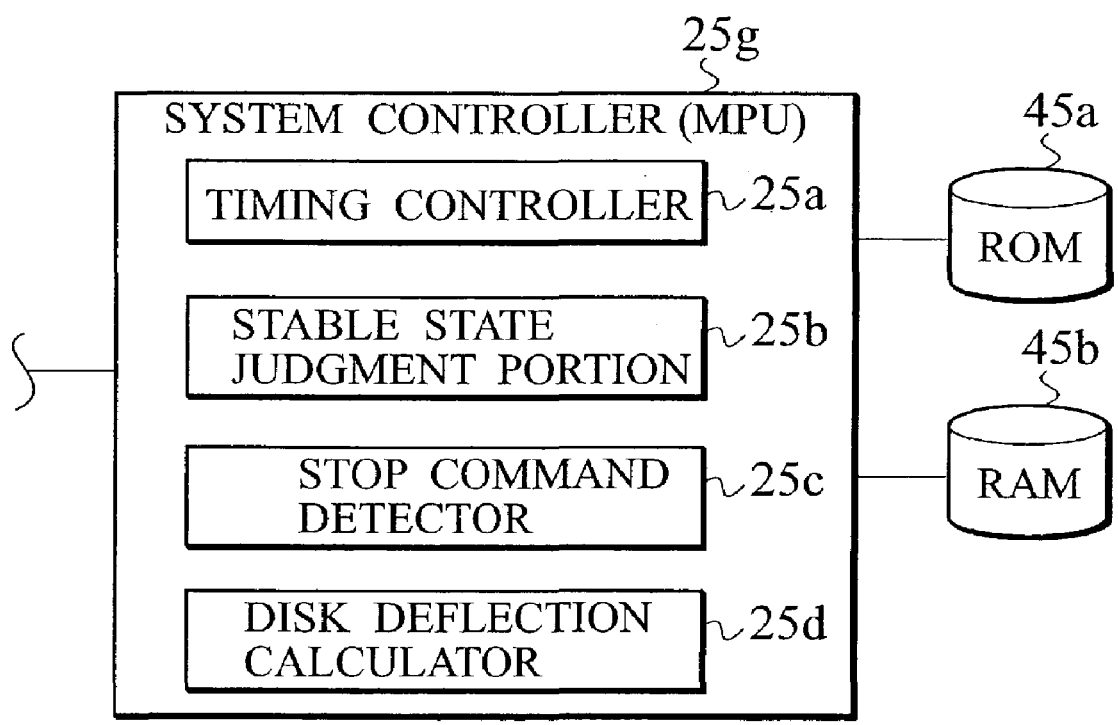
FIG. 21 is a functional block diagram of a system controller according to the third embodiment of the present invention.

As shown in FIG. 21, the system controller 25*g* includes a disk deflection calculator 25*d*. As shown in FIG. 20, in the case of reproducing an optical disk having a large disk deflection, a plane of the optical disks 11 considerably tilts for the plane which is perpendicular to the spinning shaft. The proportional relation is formed between a quantity of the disk deflection "a" at B point and a quantity of disk deflection "ba" at the A point, as it is clear from FIG. 20. The disk deflection calculator 25*d* calculates the quantity of the disk deflection in every seek, and control an amplification factor Kf of the second amplifier 65*b* by the quantity of calculated disk deflection. In addition, an eccentricity quantity of the inner circumference of the optical disk is equal to an eccentricity quantity of the circumference as for an eccentricity.

Figure 22:
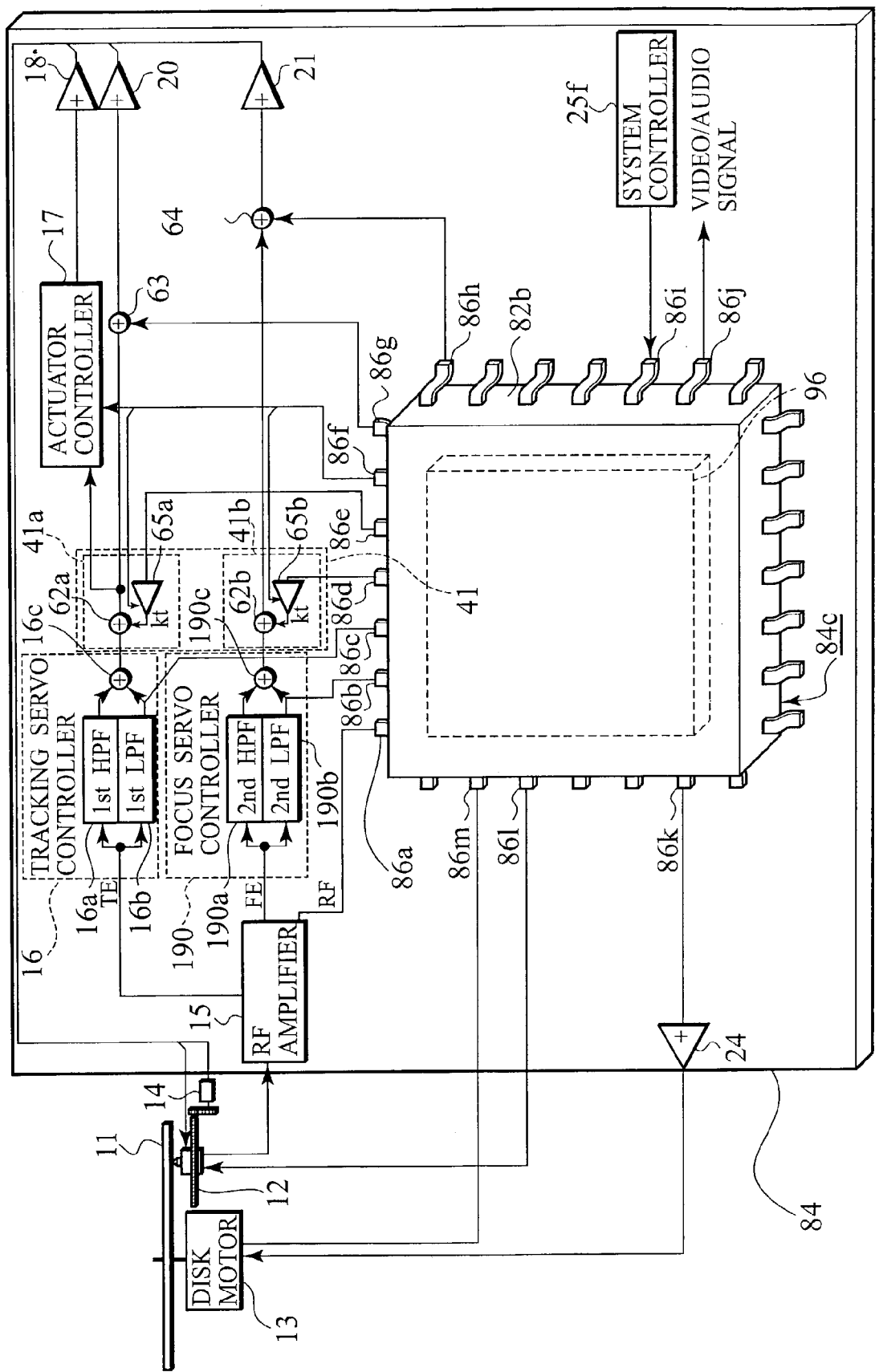
FIG. 22 is a mounting example of the semiconductor integrated circuit according to the third embodiment of the present invention.

The semiconductor integrated circuit 96 according to the second embodiment of the present invention shown in FIG. 14 is available in a packaged semiconductor integrated circuit 84c according to the third embodiment of the present invention shown in FIG. 19. A first memory output terminal 86e shown in FIG. 22 is connected to the first amplifier 65a. A second memory output terminal 86d is connected to the second amplifier 65b. The other elements are similar to the packaged semiconductor integrated circuit 84b according to the second embodiment of the present invention shown in FIG. 15.

Next, the operation of the rotation control circuit 51d according to the third embodiment of the present invention is explained using FIGS. 19–FIG. 21, FIG. 23, and FIGS. 24A–24E. However, description of the operation which is similar to the first and second embodiment of the present invention is omitted.

Figure 23:
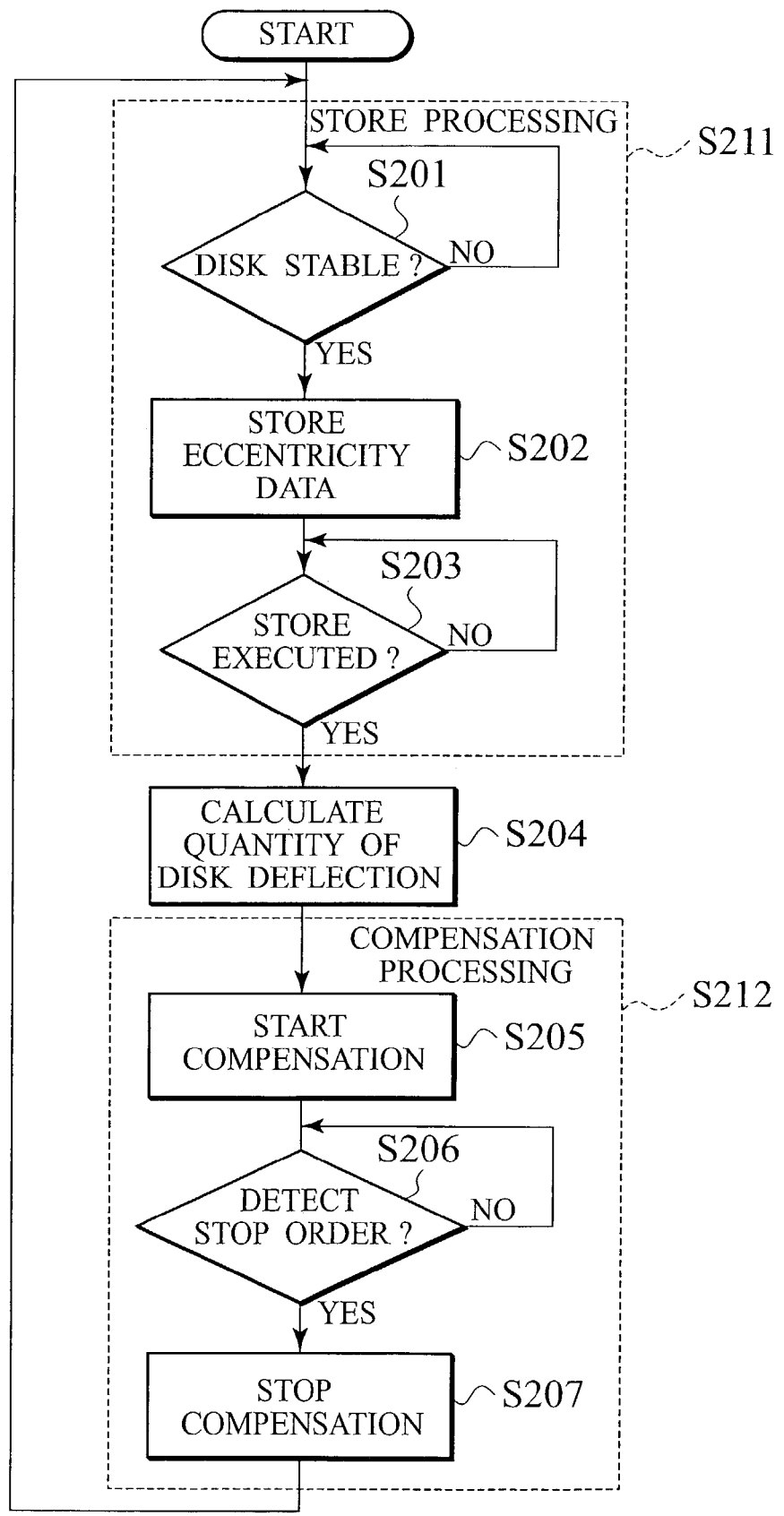
FIG. 23 is a flowchart showing a method for controlling the rotation according to the third embodiment of the present invention.

(A) To begin with, the disk deflection data is stored in step S211 shown in FIG. 23. As shown in FIG. 24A, the memory circuit provides the disk deflection data.

(B) Next, the disk deflection calculator 25b shown in FIG. 21 calculates a quantity of the disk deflection. For example, as shown in FIG. 20, tracking direction of optical disk 11 as an x-axis, pickup 12 moves from an "A" point to a "B" point, and pickup 12 moves to the "A" point again. The disk deflection quantity decreases from the "A" point to the "B" point, and the disk deflection quantity increases from the "B" point to the "A" point. Therefore, the disk deflection calculator 25d calculates a disk deflection coefficient shown in FIG. 24B. Here, the system controller 25g detects positions where the pickup is located in the point on the x-axis of the optical disk 11 shown in FIG. 20. Next, the disk deflection coefficient is set at the second amplifier 65b shown in FIG. 19. As shown in FIG. 24C, an output signal of memory shown in FIG. 24A is multiplied by disk deflection coefficient "b".

(C) Next, at step S205, the rotation compensation is started. When the rotation compensation is started, as shown in FIG. 24C, the amplification factor of the second amplifier 65b is gradually increased. As shown in FIG. 24E, an amplified memory output is generated by the second amplifier 65b. The amplified memory output is transmitted to the second adder 62b.

(D) Next, the process advances to step S207 when the stable state judgment portion 25b in the system controller 25g detected the generation of an extraordinary condition or the stop command detector 25c detected a stop command of the rotation compensation. In step S207, the amplification factor of the second amplifier becomes zero, and the rotation compensation completes.

With the rotation control circuit 51d according to the third embodiment, it is possible that the more accurate disk deflection data is added to an output signal of the focuses servo controller 190. Therefore, an optical disk having a large disk deflection can be reproduced. In addition, the pickup 12 can stably carry out track jump and layer jump.

(Fourth Embodiment)

Figure 25:
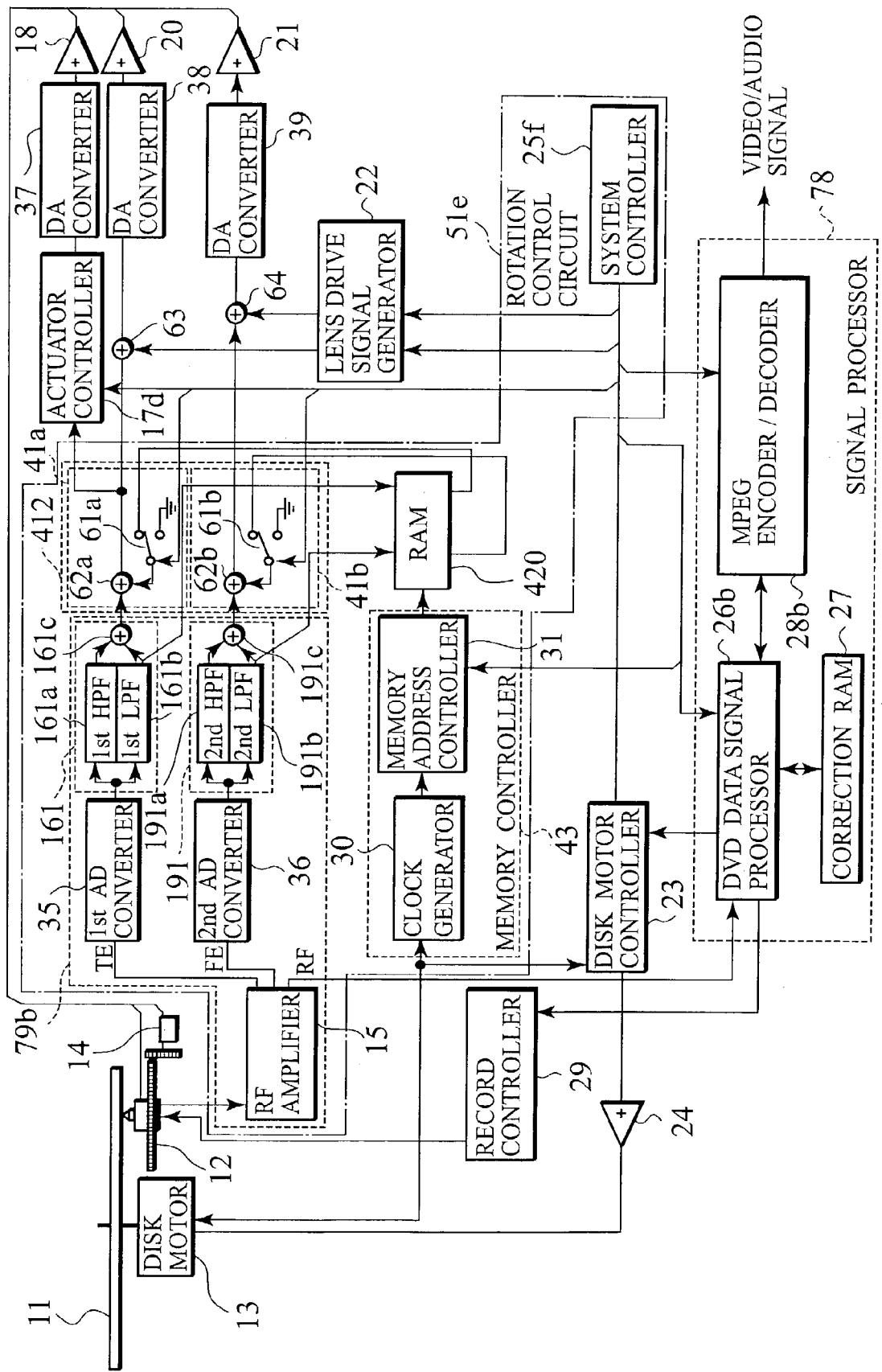
FIG. 25 is a block diagram of an optical disk drive according to a fourth embodiment of the present invention.
Figure 26:
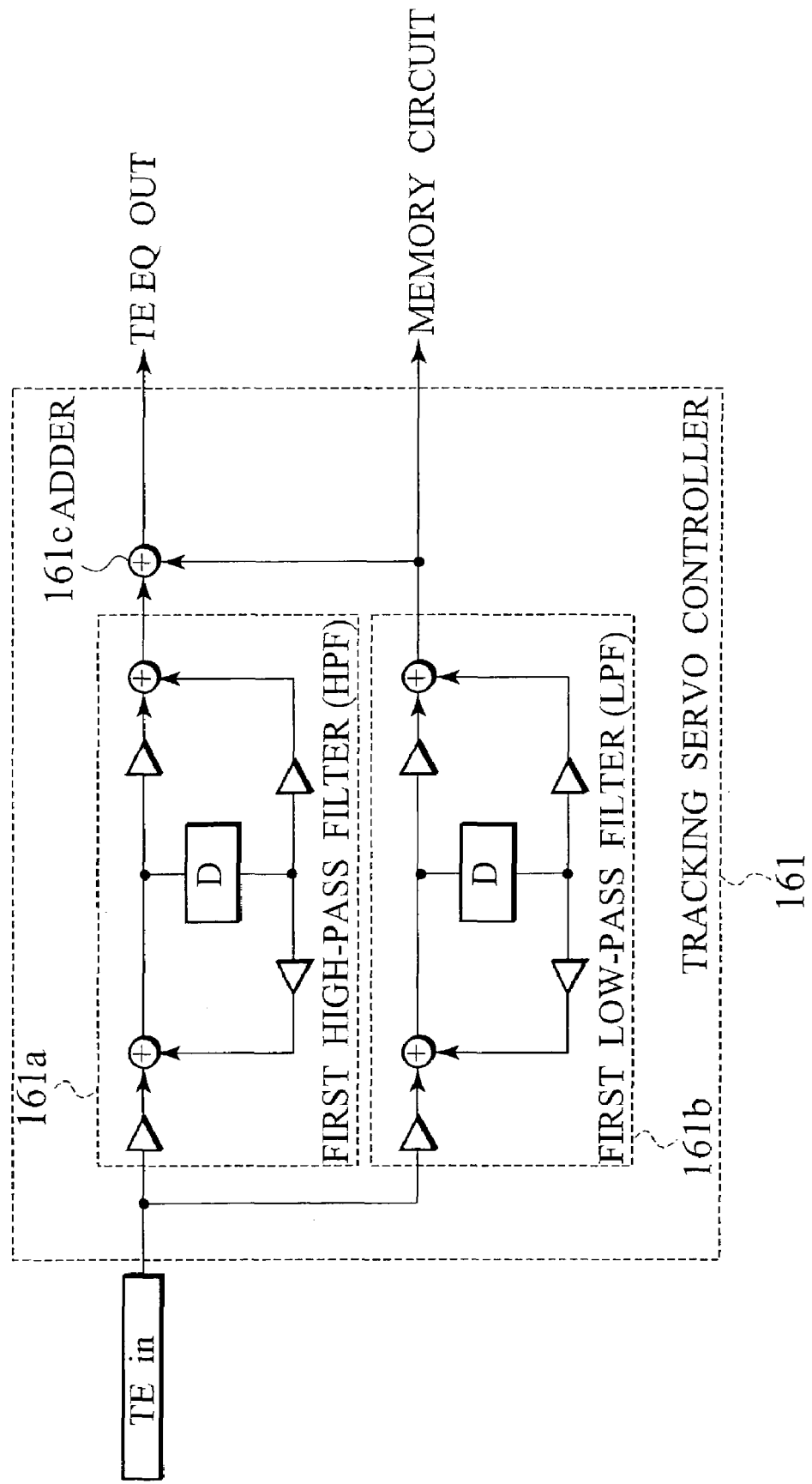
FIG. 26 is a concrete configuration example of a tracking servo controller according to the fourth embodiment of the present invention.

As shown in FIG. 25, a rotation control circuit 51e according to the fourth embodiment of the present invention includes a first AD converter 35 connected between the RF amplifier 15 and the tracking servo controller 16, and second AD converter 36 connected between the RF amplifier 15 and the focus servo controller 191. The memory circuit 420 doesn't include the AD converter 32 and the DA converter 34 shown in FIG. 1. As shown in FIG. 26, a first high-pass filter 161a and a first low-pass filter 161b are composed of digital filters. An output side of the first high-pass filter 161a and an output side of the first low-pass filter 161b are connected to an adder 161c. The elements of focus servo controller 191 are similar to the tracking servo controller 161. The tracking servo controller 161 has a frequency characteristic shown in FIG. 3. The focus servo controller 191 has a frequency characteristic shown in FIG. 13B. An output side of the first low-pass filter 161b and an output side of the second low-pass filter 191b are connected to the memory circuit 420.

In outside of the rotation control circuit 51e, an input side of a motor driver 18, an input side of an actuator driver 20, and an input side of an actuator driver 21 are connected to a DA converter 37, 38, and 39 respectively. An output signal of the first adder 62a is transmitted to the actuator controller 17d. The actuator controller 17d is a digital circuit. An output signal of the actuator controller 17d is converted into an analog signal in the DA converter 37. An output signal of the adder 64 is converted into an analog signal in the DA converter 39.

Figure 27:
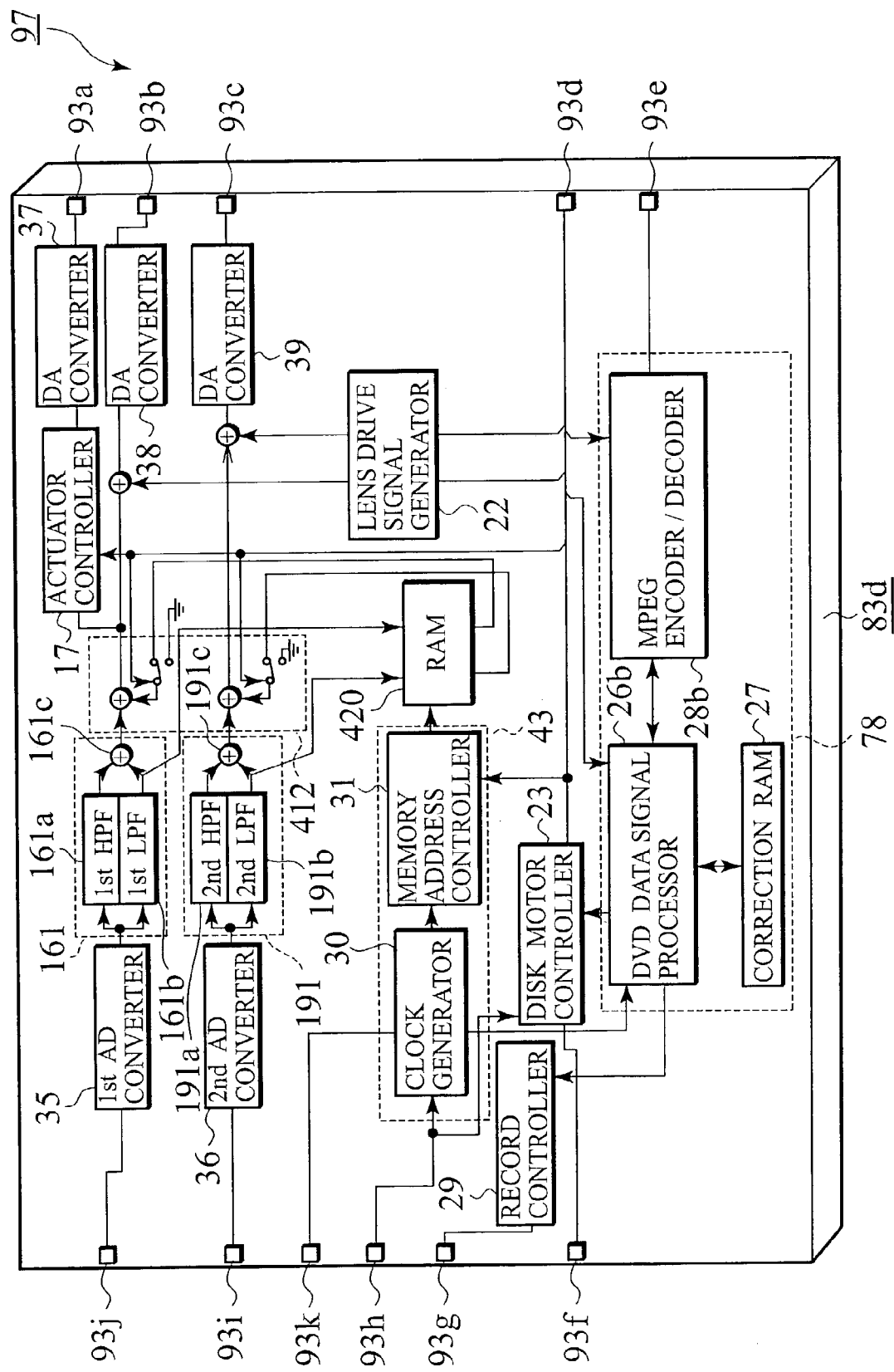
FIG. 27 is a block diagram of composition which integrated a part of the optical disk drive according to the third embodiment of the present invention monolithically on the same semiconductor chip.

As shown in FIG. 27, The first AD converter 35, the second AD converter 36, the pickup controller 79c, the compensation signal adder 412, the memory circuit 420, the memory controller 43, the actuator controller 17d, the lens drive signal generator 22, the disk motor controller 23, the record controller 29, the DA converter 37,38,39, the signal processor 78 shown in FIG. 25 can be monolithically integrated so as to form the semiconductor integrated circuit 97 on the same semiconductor chip 83d. As shown in FIG. 27, A bonding pad 93a, a bonding pad 93b, and a bonding pad 93a are connected to the DA converter 37, the DA converter 38, and the DA converter 39 respectively. A bonding pad 93d is connected to the signal processor 78, the actuator controller 17d, the disk motor controller 23, the memory address controller 31, and the lens drive signal generator 22. A bonding pad 93f is connected to the disk motor controller 23. A bonding pad 93g is connected to the record controller 29. A bonding pad 93h is connected to the clock generator 30 and the disk motor controller 23. A bonding pad 93k is connected to the DVD data signal processor 26b. A bonding pad 93i is connected to the second AD converter 36. A bonding pad 93j is connected to the first AD converter 35.

Figure 28:
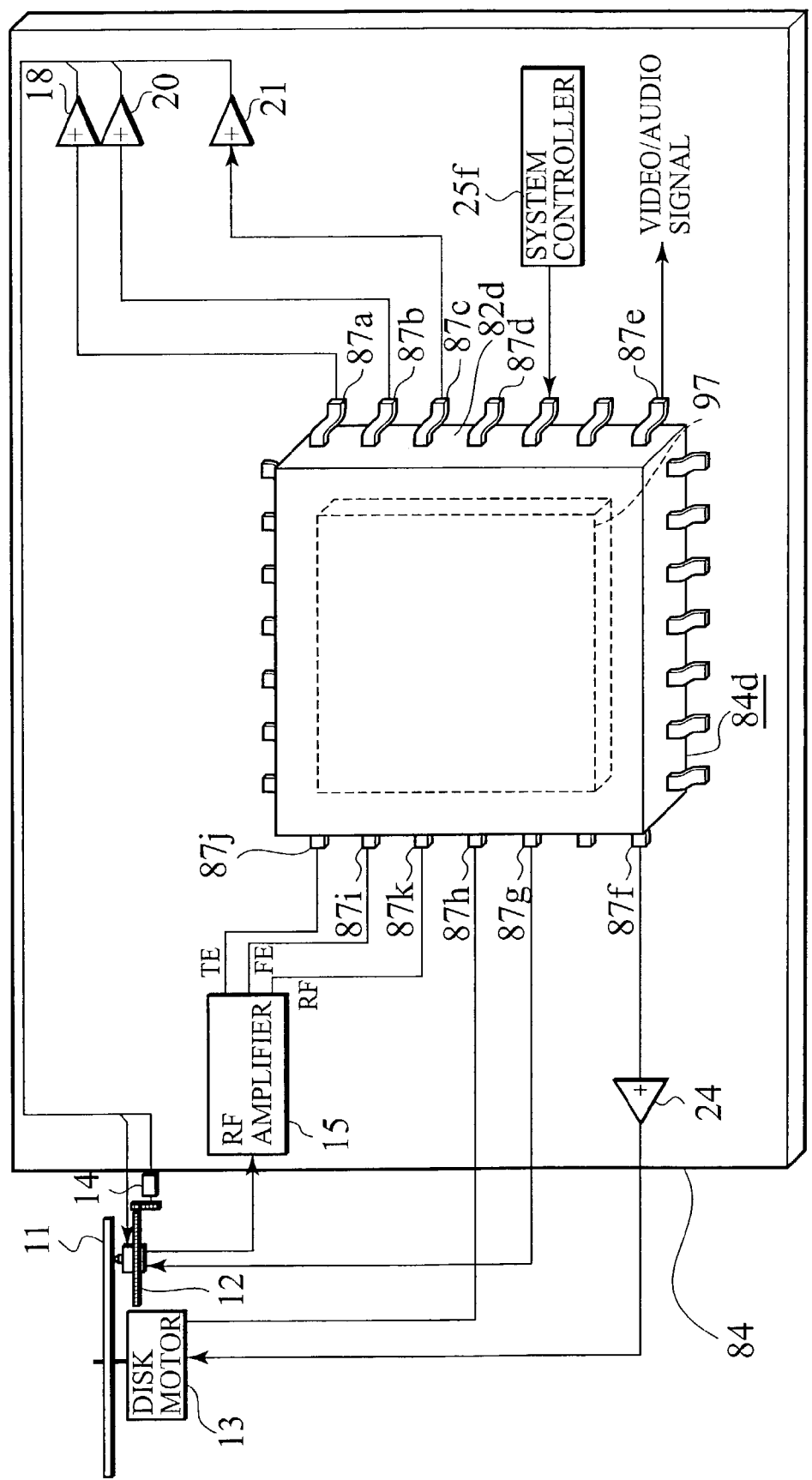
FIG. 28 is a mounting example of the semiconductor integrated circuit according to the fourth embodiment of the present invention.
Figure 29:
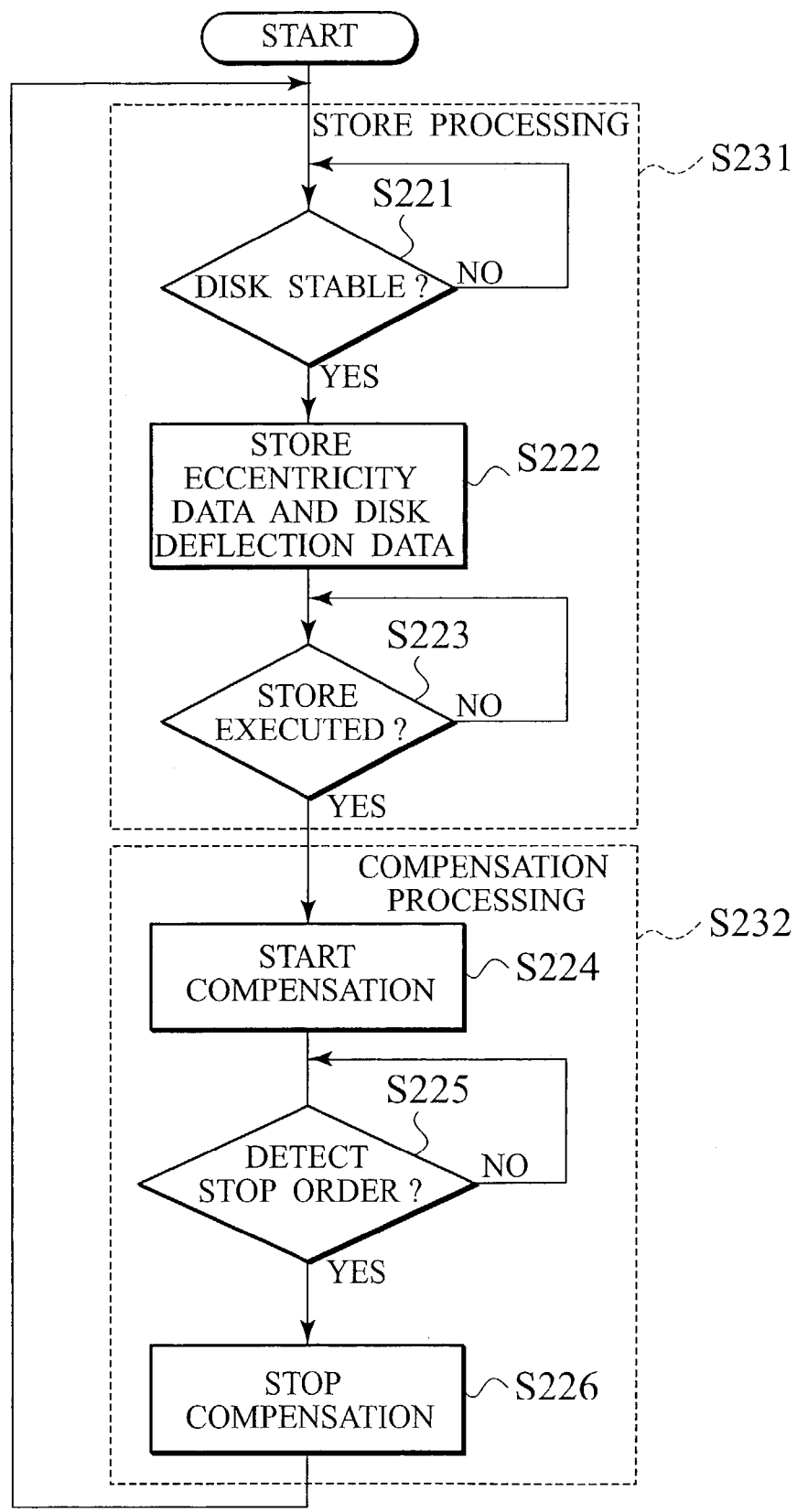
FIG. 29 is a flowchart showing a method for controlling the rotation according to the fourth embodiment of the present invention.

As shown in FIG. 28, the semiconductor integrated circuit 97 shown in FIG. 27 is covered by a mold resin 82d, and a packaged semiconductor integrated circuit 84d is formed. A motor driver terminal 87a is connected to the bonding pad 91a. Actuator driver terminals 87b, 87c are connected to the bonding pads 93b, 93c respectively. A system controller terminal 87d is connected to the bonding pad 93d. A data output terminal 87e is connected to the bonding pad 93e. A motor driver terminal 87f is connected to the bonding pad 93f. A pickup terminal 87g is connected to the bonding pad 93g. A FG terminal 87h is connected to the bonding pad 93h. A RF terminal 87k is connected to the bonding pad 93k. A FE terminal 87i is connected to the bonding pad 93i. A TE terminal 87j is connected to the bonding pad 93j.

Next, the operation of the rotation control circuit 51e according to the fourth embodiment of the present invention is explained using FIG. 4, FIG. 25, FIG. 26, FIG. 29, and FIGS. 30A–30D. However, description of the operation similar to the first embodiment of the present invention is omitted.

(A) For example, as shown in FIG. 30A, the pickup 12 detects the sinusoidal displacement for the effect of the eccentricity and the disk deflection of the optical disk 11 in the tracking direction and the focus direction. The tracking error signal TE is transmitted to the first AD converter 35, and the tracking error signal TE is converted into an analog signal. The focus error signal FE is transmitted to the second AD converter 36, and the focus error signal FE is converted into an analog signal. As shown in FIG. 30B, the first low-pass filter 161b generates the eccentricity data.

(B) Next, the clock generator 30 improves the resolution of the FG signal supplied from the disk motor 13. The clock generated by the clock generator 30 is transmitted to the memory address controller 31. In step S221 shown in FIG. 29, the stable state judgment portion 25b shown in FIG. 4 judges whether the rotational frequency of the disk motor 13 is steady state or not.

(C) When the rotational frequency is judged as the steady state by the steady states judgment portion 25b at step S221, the control advances to step S222. Next, at step S102, timing controller 25a shown in FIG. 4 instructs the memory address controller 31 to store the eccentricity data and the disk deflection data corresponding to one revolution of the optical disk 11. At step S223, when the eccentricity data and the disk deflection data for the one revolution of the optical disk 11 were stored in RAM 420, the process advances to step S224.

(D) Next, at step S224, the rotation compensation starts using the eccentricity data and the disk deflection data of the one revolution of the optical disk 11 stored in the RAM 420. Next, at step S225, the process advances to step S226 when the stable state judgment portion 25b shown in FIG. 4 detected the generation of an extraordinary condition or the stop command detector 25c detected a stop command of the rotation compensation. In step S226, the first switching circuit 61a and the second switching circuit are turned off, and the rotation compensation completes.

With the rotation control circuit 51e according to the fourth embodiment, the most part of the optical disk drive shown in FIG. 25 can be composed of the digital circuit. Therefore, the pickup 12 can stably carry out both track jump and layer jump operations, even if the rotational frequency of the optical disk 11 having the eccentricity and the disk deflection increases.

Figure 31:
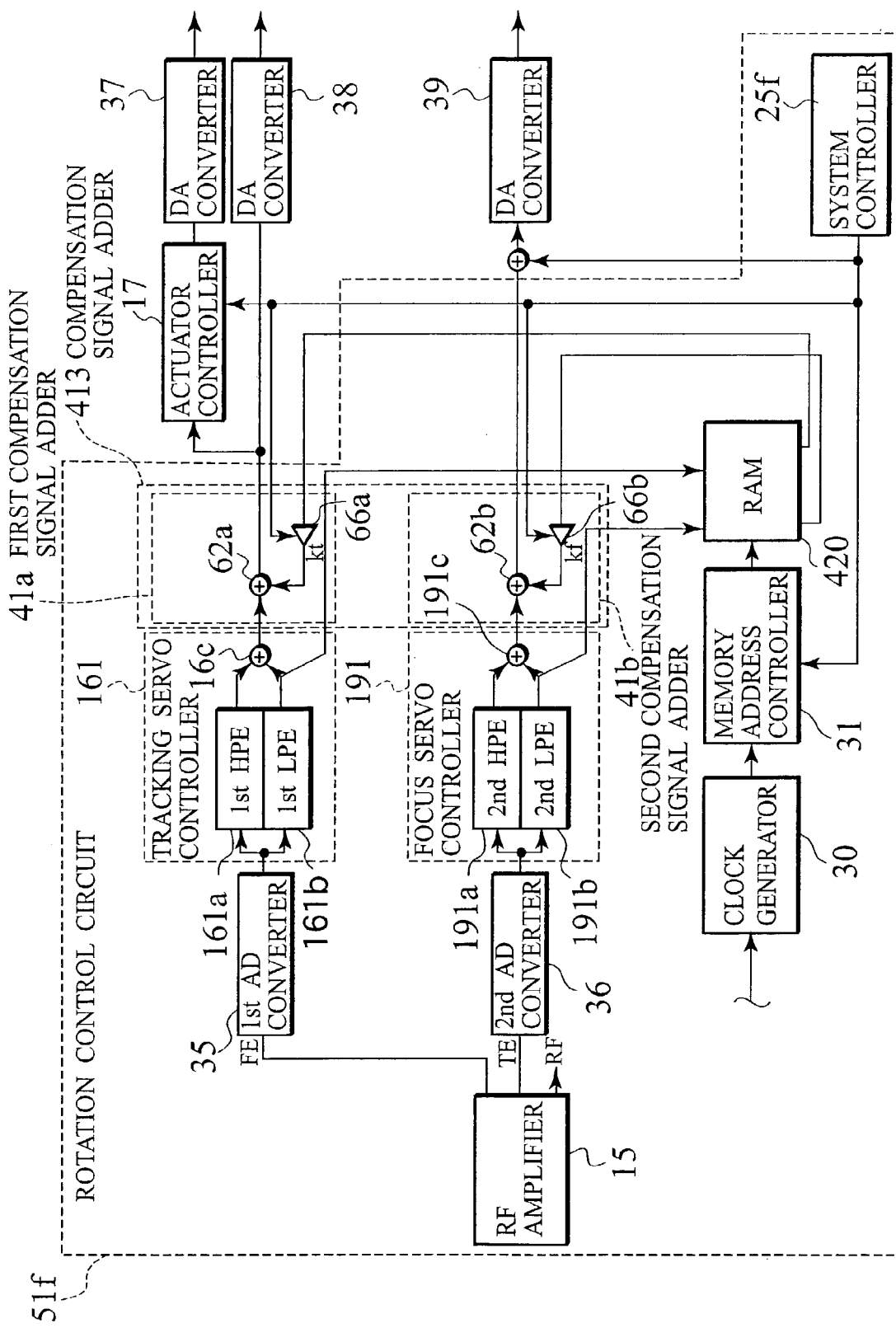
FIG. 31 is a block diagram of a rotation control circuit according to the modification of the fourth embodiment of the present invention.

As shown in FIG. 31, a first compensation signal adder 41a according to the modification of the fourth embodiment of the present invention includes a first adder 62a connected to the tracking servo controller 16, and a first coefficient multiplier 66a having an output side connected to the first adder 62a, and an input side connected to the memory circuit 420. In addition, a second compensation signal adder 41b includes a second adder 62b connected to the focus servo controller 191, and a second coefficient multiplier 66b having an output side connected to the second adder 62b, and an input side connected to the memory circuit 420. The first coefficient multiplier 66a and the second coefficients multiplier 66b are mainly constituted by a counter. It is possible to make the multiplier coefficient to zero by resetting the counter. By gradually increasing multiplier coefficient Kt, it is possible that the first adder 62a gradually transmits the eccentricity data provided by the memory circuit 420. Moreover, by gradually increasing multiplier coefficient Kf, it is possible that the second adder 62b gradually transmits the disk deflection data provided by the memory circuit 420. When the compensation completes, the multiplier coefficient is gradually decreased.

(Other Embodiments)

Various modifications will become possible for those skilled in the art after receiving the teachings of the present disclosure without departing from the scope thereof.

Though tracking servo controller 16 is composed of the high-pass filter 16a and the low-pass filter 16b in the first embodiment, only the focus servo controller 19 may be composed of high-pass filter and low-pass filter.

Figure 32:
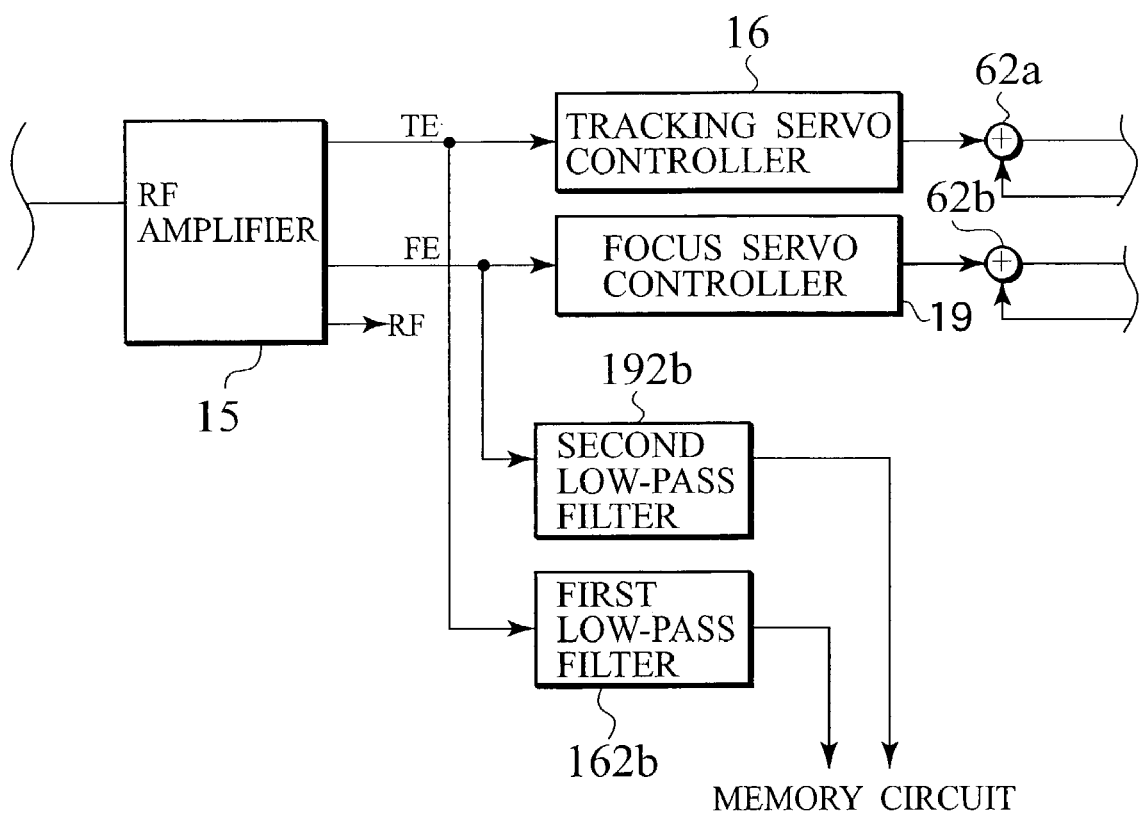
FIG. 32 is a block diagram of a part of a rotation control circuit according to the other embodiment of the present invention.
Figure 33:
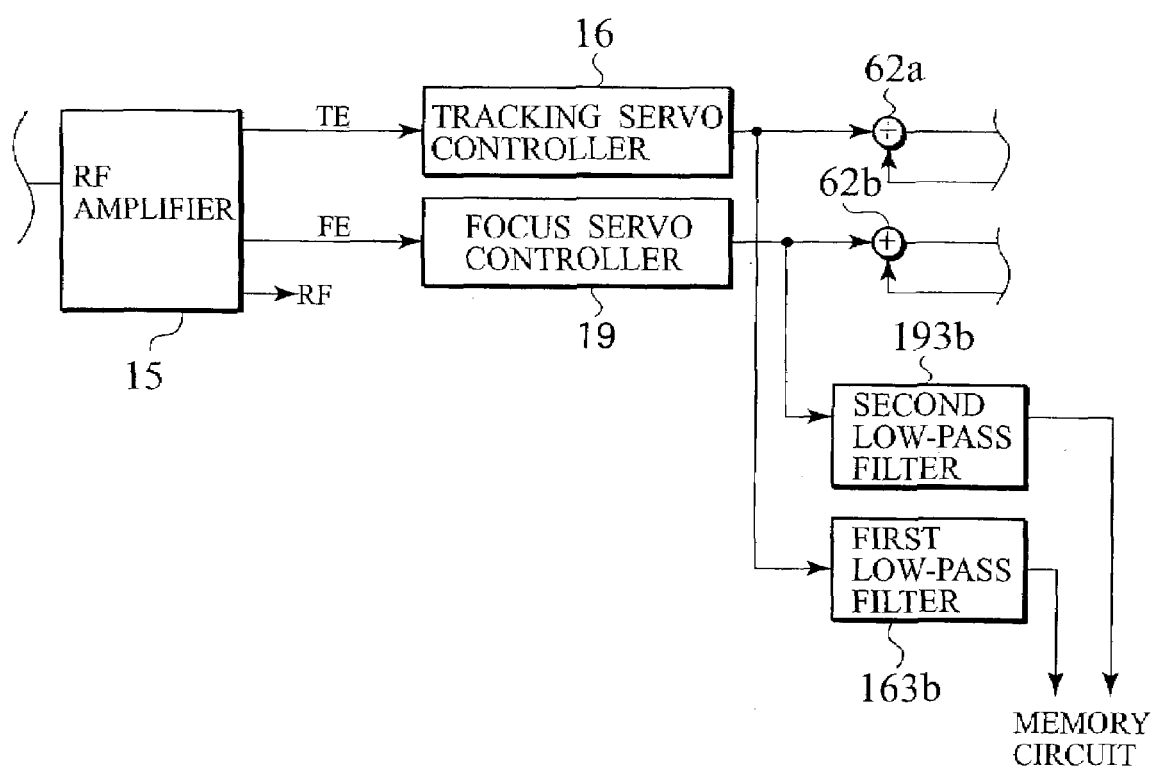
FIG. 33 is a block diagram of a part of a rotation control circuit according to the other embodiment of the present invention.

In the first though fourth embodiments of the present invention, the tracking servo controller 16, 161 and the focus servo controller 19, 190, 191 include the high-pass filter and the low-pass filter. However, as shown in FIG. 32, a composition which includes a first low-pass filter 162b connected to an input side of the tracking servo controller 16, and a second low-pass filter 192b connected to an input side of the focus servo controller 19 can be used. An output side of the first low-pass filter 162b and an output side of the second low-pass filter 192b are connected to the memory circuit 42. Or, as shown in FIG. 33, a composition which includes a first low-pass filter 162b connected to an output side of the tracking servo controller 16, and a second low-pass filter 192b connected to an output side of the focus servo controller 19 can be used. Like this, various configurations can be used, if the low frequency component of the tracking error signal TE and the focus error signal FE can input it in the memory circuit 42.

In the first though fourth embodiments of the present invention, reproducing operation was mainly explained, but can be also applied in the recording operation. However, the effectiveness is larger when rotation control circuit according to the third and fourth embodiment of present invention is applied to the DVD having two layers disk because a recordable DVD at present only has one layer. Though the first through fourth embodiment of present invention are divided into the CD-R/RW drive and the DVD drive, and rotation control circuit according to the first through fourth embodiment of present invention can be applied to possible recording optical disk drive which reproduces both of the DVD and the CD-R/RW. In the first though fourth embodiments of the present invention, it is possible to do the switching circuit unnecessary, if the timing of the readout of eccentricity data that memory controller 31 shown in FIG. 1 was memorized so that the memory can be controlled.

In the first though third embodiments of the present invention, the semiconductor integrated circuit is implemented by known CMOS process. For example, by using digital analog mixing process, analog circuits such as the tracking servo controller 16, the focus servo controller 19, the compensation signal adder 41a, the actuator controller 17, and the adders 63, 64 shown in FIG. 1 can be the monolithically integrated.

In the rotation control circuit 51f according to the modification of the fourth embodiment of the present invention shown in FIG. 31, the system controller 25f can include the disk deflection calculator 25d shown in FIG. 21. In this case, the operation of the rotation control circuit 51f is similar to the operation of the rotation control circuit 51d. More specifically, the signals shown in FIG. 24 become digital data.

Moreover, the semiconductor integrated circuit 84d according to the fourth embodiment of the present invention can be formed as system large scale integrated circuit (LSI) by integrating the system controller 25f on the same semiconductor chip 83d. In this case, the wirings connecting respective circuit to the system controller 25f serves as a bus line.

What is claimed is:

1. A rotation control circuit comprising:
   a pickup controller configured to amplify an error signal detected by a pickup from an optical disk, and to generate both a low-frequency component in the error signal and a pickup control signal so as to control the pickup;
a memory controller configured to generate a memory address control signal in synchronization with a frequency generator signal provided by a disk motor, including:
a clock generator connected to the disk motor, and
a memory address controller having an input side connected to the clock generator;
a memory circuit connected to an output side of the memory address controller and configured to store the low-frequency component by using the memory address control signal at a specified timing;
a compensation signal adder configured to add the low-frequency component to the pickup control signal at another specified timing; and
a system controller configured to control operational timing of the memory controller and the compensation signal adder.

2. The rotation control circuit of claim 1, wherein the memory circuit comprises:
an analog to digital converter;
a random access memory connected to the analog to digital converter; and
a digital to analog converter connected to the random access memory.

3. The rotation control circuit of claim 1, wherein the system controller comprises:
a timing controller configured to control operation timing of the system of the optical disk drive;
a stable state judgment portion configured to judge whether a rotation of the disk motor is steady state; and
a stop command detector configured to detect the stop command of a rotation compensation.

4. The rotation control circuit of claim 1, wherein the pickup controller comprises:
a radio frequency amplifier connected to the pickup;
a tracking servo controller having an input side connected to the radio frequency amplifier, and an output side connected to the memory circuit; and
a focus servo controller connected to the radio frequency amplifier.

5. The rotation control circuit of claim 4, wherein the tracking servo controller comprises:
a first high-pass filter connected to the radio frequency amplifier;
a first low-pass filter connected to the radio frequency amplifier; and
an adder having one terminal connected to the first high-pass filter, and another terminal connected to the first low-pass filter.

6. The rotation control circuit of claim 4, wherein the compensation signal adder comprises:
a first adder connected to the tracking servo controller; and
a first switch circuit connected between the first adder and the memory circuit.

7. The rotation control circuit of claim 4, wherein the compensation signal adder comprises:
a first adder connected to the tracking servo controller; and
a first amplifier connected between the first adder and the memory circuit.

8. The rotation control circuit of claim 4, wherein the pickup controller comprises a first analog to digital converter connected between the radio frequency amplifier and the tracking servo controller.

9. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup,
a tracking servo controller connected to the radio frequency amplifier, and
a focus servo controller having an input side connected to the radio frequency amplifier;
a memory controller configured to generate a memory address control signal in synchronization with a frequency generator signal provided by a disk motor;
a memory circuit connected to an output side of the focus servo controller and configured to store the low-frequency component by using the memory address control signal at a specified timing;
a compensation signal adder configured to add the low-frequency component to the pickup control signal at another specified timing; and
a system controller configured to control operational timing of the memory controller and the compensation signal adder.

10. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup,
a tracking servo controller connected to the radio frequency amplifier, and
a focus servo controller having an input side connected to the radio frequency amplifier, including:
a second high-pass filter connected to the radio frequency amplifier,
a second low-pass filter connected to the radio frequency amplifier, and
an adder having one terminal connected to the second high-pass filter, and another terminal connected to the second low-pass filter;
a memory controller configured to generate a memory address control signal in synchronization with a frequency generator signal provided by a disk motor;
a memory circuit connected to an output side of the focus servo controller and configured to store the low-frequency component by using the memory address control signal at a specified timing;
a compensation signal adder configured to add the low-frequency component to the pickup control signal at another specified timing; and
a system controller configured to control operational timing of the memory controller and the compensation signal adder.

11. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup, a tracking servo controller connected to the radio frequency amplifier, and
a focus servo controller having an input side connected to the radio frequency amplifier;

a memory controller configured to generate a memory address control signal in synchronization with a frequency generator signal provided by a disk motor;

a memory circuit connected to an output side of the focus servo controller and configured to store the low-frequency component by using the memory address control signal at a specified timing;

a compensation signal adder configured to add the low-frequency component to the pickup control signal at another specified timing, including:
a second adder connected to the focus servo controller, and
a second switch circuit connected between the second adder and the memory circuit; and a system controller configured to control operational timing of the memory controller and the compensation signal adder.

12. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup,
a tracking servo controller connected to the radio frequency amplifier, and
a focus servo controller having an input side connected to the radio frequency amplifier;

a memory controller configured to generate a memory address control signal in synchronization with a frequency generator signal provided by a disk motor;

a memory circuit connected to an output side of the focus servo controller and configured to store the low-frequency component by using the memory address control signal at a specified timing;

a compensation signal adder configured to add the low-frequency component to the pickup control signal at another specified timing, including:
a second adder connected to the focus servo controller, and
a second amplifier connected between the second adder and the memory circuit; and a system controller configured to control operational timing of the memory controller and the compensation signal adder.

13. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup,
a tracking servo controller connected to the radio frequency amplifier, and
a focus servo controller having an input side connected to the radio frequency amplifier;

a memory controller configured to generate a memory address control signal in synchronization with a frequency generator signal provided by a disk motor;

a memory circuit connected to an output side of the focus servo controller and configured to store the low-frequency component by using the memory address control signal at a specified timing;

a compensation signal adder configured to add the low-frequency component to the pickup control signal at another specified timing, including:
a second adder connected to the focus servo controller, and
a second amplifier connected between the second adder and the memory circuit; and a system controller configured to control operational timing of the memory controller and the compensation signal adder, including a disk deflection calculator configured to calculate a disk deflection quantity in every seek so as to determine an amplification factor of the second amplifier by the disk deflection quantity.

14. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup,
a tracking servo controller connected to the radio frequency amplifier, and
a focus servo controller having an input side connected to the radio frequency amplifier;

a memory controller configured to generate a memory address control signal in synchronization with a frequency generator signal provided by a disk motor;

a memory circuit connected to an output side of the focus servo controller and configured to store the low-frequency component by using the memory address control signal at a specified timing;

a compensation signal adder configured to add the low-frequency component to the pickup control signal at another specified timing, including:
a second adder connected to the focus servo controller, and
a second coefficient multiplier connected to the second adder; and a system controller configured to control operational timing of the memory controller and the compensation signal adder.

15. A rotation control circuit comprising:
a pickup controller configured to amplify an error signal detected by a pickup from an optical disk, and to generate both a low-frequency component in the error signal and a pickup control signal so as to control the pickup, including:
a radio frequency amplifier connected to the pickup,
a tracking servo controller connected to the radio frequency amplifier, and
a focus servo controller having an input side connected to the radio frequency amplifier;

a memory controller configured to generate a memory address control signal in synchronization with a frequency generator signal provided by a disk motor;

a memory circuit connected to an output side of the focus servo controller and configured to store the low-frequency component by using the memory address control signal at a specified timing;

a compensation signal adder configured to add the low-frequency component to the pickup control signal at another specified timing, including:
a second adder connected to the focus servo controller, and
a second coefficient multiplier connected to the second adder;

a system controller configured to control operational timing of the memory controller and the compensation signal adder, including a disk deflection calculator configured to calculate a disk deflection quantity in every seek so as to determine a multiplier coefficient of the second coefficient multiplier by the disk deflection quantity.

16. A rotation control circuit comprising:
a pickup controller configured to amplify an error signal detected by a pickup from an optical disk, and to generate both a low-frequency component in the error signal and a pickup control signal so as to control the pickup, including:
  a radio frequency amplifier connected to the pickup,
  a tracking servo controller connected to the radio frequency amplifier,
  a focus servo controller having an input side connected to the radio frequency amplifier, and
  a second analog to digital converter connected between the radio frequency amplifier and the focus servo controller;
a memory controller configured to generate a memory address control signal in synchronization with a frequency generator signal provided by a disk motor;
a memory circuit connected to an output side of the focus servo controller and configured to store the low-frequency component by using the memory address control signal at a specified timing;
a compensation signal adder configured to add the low-frequency component to the pickup control signal at another specified timing; and
a system controller configured to control operational timing of the memory controller and the compensation signal adder.

17. A rotation control circuit comprising:
a pickup controller configured to amplify an error signal detected by a pickup from an optical disk, and to generate both a low-frequency component in the error signal and a pickup control signal so as to control the pickup, including:
  a radio frequency amplifier connected to the pickup,
  a tracking servo controller having an input side connected to the radio frequency amplifier, and
  a focus servo controller having an input side connected to the radio frequency amplifier;
a memory controller configured to generate a memory address control signal in synchronization with a frequency generator signal provided by a disk motor;
a memory circuit connected to each output side of the tracking servo controller and the focus servo controller, and configured to store the low-frequency component by using the memory address control signal at a specified timing;
a compensation signal adder configured to add the low-frequency component to the pickup control signal at another specified timing; and
a system controller configured to control operational timing of the memory controller and the compensation signal adder.

18. A semiconductor integrated circuit comprising:
a semiconductor chip;
a tracking servo controller integrated on the semiconductor chip and configured to receive a tracking error signal;
a focus servo controller integrated on the semiconductor chip and configured to receive a focus error signal;
a memory controller integrated on the semiconductor chip and configured to generate a memory address control signal in synchronization with a frequency generator signal provided by a disk motor;
a memory circuit integrated on the semiconductor chip and configured to store a low-frequency component in the tracking error signal and the focus error signal by using the memory address control signal at a specified timing; and
a compensation signal adder integrated on the semiconductor chip and configured to add the low-frequency component to output signals of the tracking servo controller and the focus servo controller at another specified timing.

19. The semiconductor integrated circuit of claim 18, further comprising:
a first low-pass filter connected between an input side of the tracking servo controller and the memory circuit; and
a second low-pass filter connected between an input side of the focus servo controller and the memory circuit.

20. The semiconductor integrated circuit of claim 18, further comprising:
a first low-pass filter connected between an output side of the tracking servo controller and the memory circuit; and
a second low-pass filter connected between an output side of the focus servo controller and the memory circuit.

21. An optical disk drive comprising:
a disk motor configured to drive an optical disk;
a pickup configured to emit a light to the optical disk, and to read a reflected light from the optical disk;
a rotation control circuit configured to generate both a low-frequency component in an error signal detected by the pickup and a pickup control signal for control of the pickup, and to store the low-frequency component in synchronization with a rotation of the optical disk, and to add the low-frequency component to the pickup control signal, including:
  a clock generator connected to the disk motor, and
  a memory address controller having an input side connected to the clock generator;
a signal processor configured to provide a reproducing signal and a recording signal to the pickup;
a record controller configured to record the recording signal in the optical disk; and
a disk motor controller configured to control the rotation of the disk motor.

* * * * *